United States Patent
Hosotani

(10) Patent No.: US 8,611,110 B2
(45) Date of Patent: Dec. 17, 2013

(54) SWITCHING POWER SUPPLY APPARATUS

(75) Inventor: Tatsuya Hosotani, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 13/584,844

(22) Filed: Aug. 14, 2012

(65) Prior Publication Data

US 2012/0314458 A1   Dec. 13, 2012

Related U.S. Application Data

(63) Continuation of application No. PCT/JP2011/053221, filed on Feb. 16, 2011.

(30) Foreign Application Priority Data

Feb. 23, 2010  (JP) ................................. 2010-037787

(51) Int. Cl.
*H02M 3/335* (2006.01)
*H02M 3/24* (2006.01)
*H02M 7/537* (2006.01)
*H02M 7/538* (2007.01)

(52) U.S. Cl.
USPC .............. 363/22; 363/18; 363/19; 363/21.02; 363/23; 363/95; 363/98; 363/131; 363/133

(58) Field of Classification Search
USPC ............. 363/18, 19, 21.01–21.18, 22, 23, 95, 363/98, 131, 133
See application file for complete search history.

(56) References Cited

U.S. PATENT DOCUMENTS

| | | | | |
|---|---|---|---|---|
| 6,061,252 A * | 5/2000 | Hosotani | ......................... | 363/16 |
| 6,208,530 B1 * | 3/2001 | Hosotani | ......................... | 363/19 |
| 6,577,511 B2 * | 6/2003 | Yamaguchi et al. | ....... | 363/21.07 |
| 2002/0080634 A1 * | 6/2002 | Nozawa et al. | ................. | 363/97 |
| 2002/0101742 A1 * | 8/2002 | Hosotani et al. | ................ | 363/17 |
| 2003/0048645 A1 * | 3/2003 | Hosotani et al. | ........... | 363/21.12 |
| 2003/0142521 A1 * | 7/2003 | Hosotani et al. | ............. | 363/100 |
| 2004/0130914 A1 * | 7/2004 | Abe | ............................... | 363/17 |

(Continued)

FOREIGN PATENT DOCUMENTS

| | | |
|---|---|---|
| EP | 0 998 017 A2 | 5/2000 |
| JP | 07-274498 A | 10/1995 |

(Continued)

OTHER PUBLICATIONS

Official Communication issued in International Patent Application No. PCT/JP2011/053221, mailed on May 17, 2011.

*Primary Examiner* — Bao Q Vu
*Assistant Examiner* — Yusef Ahmed
(74) *Attorney, Agent, or Firm* — Keating & Bennett, LLP

(57) ABSTRACT

A switching control IC conducts on-off control on a first switching element. A second switching control circuit is provided between a high-side driving winding of a transformer T and a second switching element. The second switching control circuit discharges a capacitor in a negative direction with a constant current during an on period of the first switching element, and then after the second switching element is turned on, charges the capacitor in a positive direction with a constant current. A transistor controls the on period of the second switching element in accordance with the ratio of a charging current to a discharge current such that the ratio of the on period of the second switching element to the on period of the first switching element is substantially always constant.

12 Claims, 27 Drawing Sheets

(56) References Cited

U.S. PATENT DOCUMENTS

| | | |
|---|---|---|
| 2006/0062024 A1* | 3/2006 | Hosotani et al. ............... 363/16 |
| 2006/0119281 A1* | 6/2006 | Nishikawa et al. ....... 315/209 R |
| 2008/0088283 A1 | 4/2008 | Ruobiao et al. |
| 2008/0112192 A1 | 5/2008 | Nishikawa |
| 2008/0291702 A1 | 11/2008 | Hosotani |
| 2009/0316444 A1* | 12/2009 | Yamaguchi et al. ....... 363/21.12 |
| 2012/0314454 A1* | 12/2012 | Hosotani .................... 363/21.01 |
| 2013/0107579 A1* | 5/2013 | Hosotani et al. ............... 363/16 |

FOREIGN PATENT DOCUMENTS

| | | |
|---|---|---|
| JP | 2001-037220 A | 2/2001 |
| JP | 2002-136121 A | 5/2002 |
| JP | 2002-209381 A | 7/2002 |
| JP | 2006-109566 A | 4/2006 |
| JP | 2006-129548 A | 5/2006 |
| JP | 2008-099385 A | 4/2008 |
| JP | 2008-125217 A | 5/2008 |
| JP | 2008-289336 A | 11/2008 |

* cited by examiner

SWITCHING POWER SUPPLY APPARATUS

BACKGROUND OF THE INVENTION

1. Field of the Invention

The present invention relates to a switching power supply apparatus that includes a transformer and two switching elements.

2. Description of the Related Art

A switching power supply apparatus of the related art that is configured such that two switching elements are alternately switched on and off in a complementary manner is described in Japanese Unexamined Patent Application Publication No. 2001-37220 and Japanese Unexamined Patent Application Publication No. 7-274498.

FIG. 1 is a circuit diagram of the switching power supply apparatus described in Japanese Unexamined Patent Application Publication No. 2001-37220. In FIG. 1, a switching power supply apparatus 1 employs a circuit that is generally called a flyback converter. A main switching element Q1 is repeatedly alternately switched on and off, and when the main switching element Q1 is switched on, the transformer 1 accumulates energy, and when the main switching element Q1 is switched off, electricity is supplied to a load. In addition, in the switching power supply apparatus 1, a so-called active clamping method is employed in which a surge voltage applied to the main switching element Q1 is clamped and a zero-voltage switching operation of the main switching element Q1 and a sub switching element Q2 is realized.

In the switching power supply apparatus 1, a FET Q1, which serves as the main switching element, a primary winding N1 of a transformer T, and a direct current power supply E are connected in series with one another, and a series circuit formed of a FET Q2, which serves as the sub switching element, and capacitor C1 is connected between the two ends of the primary winding N1 of the transformer T.

Here, the gate of the FET Q1 is connected to an end of a first driving winding N3 via a main switching element control circuit (main control circuit) 2. In addition, the source of the FET Q2 is connected to the drain of the FET Q1 and the gate of the FET Q2 is connected to an end of a second driving winding N4 of the transformer T via a sub switching control circuit (sub control circuit) 3.

In addition, the gate and the source of the FET Q2 are connected between the two ends of the second driving winding N4 via the sub control circuit 3. The sub control circuit 3 includes a transistor Q3, a capacitor C2, a resistor R1, a capacitor C3, a resistor R2 and an inductor 4. Within this circuit, the capacitor C2 and a resistor R1 form a time constant circuit.

Furthermore, the switching power supply apparatus 1 includes a rectifying diode Do and a smoothing capacitor C4 on the secondary side of the transformer T.

On the other hand, a switching power supply apparatus in which both low-side and high-side switching elements are driven using an IC is disclosed in Japanese Unexamined Patent Application Publication No. 7-274498.

The switching power supply apparatus of Japanese Unexamined Patent Application Publication No. 2001-37220 is configured such that a high-side switching element Q2 is driven using the driving winding N4 of the transformer T and the time constant circuit, and is realized using a simple circuit. However, in control in which the frequency is changed, it is preferable that the on period of the switching element Q2 also be changed, but since the on period of the switching element Q2 is substantially fixed by the time constant circuit, making such a corresponding change is difficult.

On the other hand, as in the switching power supply apparatus of Japanese Unexamined Patent Application Publication No. 7-274498, in a configuration in which both the low-side and high-side switching elements are driven by an IC, setting of a time ratio and setting of the frequency can be performed comparatively easily. However, when there is a period in which the ground potential of the high-side switching element is the same potential as the power supply voltage, an IC designed to withstand high voltages is required since direct current driving will be performed by the IC. The design of an IC designed to withstand high voltages is complex and a very expensive IC has to be used. Furthermore, in a configuration in which two switching elements are directly driven by a single IC, wiring of peripheral circuits around the IC need to be connected to both of the two switching elements and therefore the peripheral circuits also become more complex. Accordingly, it is inevitable that the switching power supply apparatus will be increased in cost.

SUMMARY OF THE INVENTION

Preferred embodiments of the present invention provide a low-cost switching power supply apparatus for which a high-voltage IC is not necessary and that ensures that low-side and high-side switching elements can be driven with a substantially constant on period ratio. Furthermore, more specifically, preferred embodiments of the present invention provide a switching power supply apparatus that ensures that the ratio between the on periods of two switching elements is substantially constant and that the two switching elements can be alternately switched on and off in a complementary manner even in the case where the load current changes and consequently the switching frequency changes.

A switching power supply apparatus according to a preferred embodiment of the present invention includes a direct current power supply input unit to which a direct current input voltage is input; a transformer (T) that includes at least a primary winding (np), a secondary winding (ns), and a high-side driving winding (nb2), which are magnetically coupled; a first switching element (Q1) of a low side and a second switching element (Q2) of a high side, the ground level of the second switching element being different from that of the first switching element, the first switching element (Q1) and the second switching element (Q2) being repeatedly turned on and off in a complementary manner such that the direct current input voltage is applied to the primary winding (np) in an on and off manner; a first switching control circuit that controls the first switching element (Q1); and a second switching control circuit that controls the second switching element (Q2), the switching power supply apparatus outputting a load current and supplying an output voltage (Vo) in accordance with a voltage output from the secondary winding (ns); wherein the first switching control circuit is a circuit that outputs a predetermined on period continuance signal to a control terminal of the first switching element (Q1) so as to cause the first switching element (Q1) to turn off after the first switching element (Q1) has been on for a predetermined on period; the second switching control circuit includes a first capacitor, a bidirectional constant current circuit including a discharge current setting circuit that sets a discharge current (Ib1) to be discharged from the first capacitor in a negative direction at a substantially constant discharge current on the basis of a voltage (negative voltage) generated in the high-side driving winding (nb2) in an on period of the first switching element (Q1), and a charging current setting circuit that sets a charging current (Ib2) with which the first capacitor is to be charged in a positive direction at a substantially constant charging current on the basis of a voltage (positive voltage) generated in the high-side driving winding (nb2) in an off period of the first switching element (Q1); a transistor (Q3) that is controlled by a charging voltage of the first capacitor, and causes the second switching element (Q2) to turn off by controlling a voltage of the control terminal of the second switching element (Q2) when the charging voltage of the first capacitor exceeds a predetermined threshold; and a turn on signal transmitting circuit that applies a voltage generated in the high-side driving winding (nb2) to the control terminal of the second switching element (Q2) so as to cause the second switching element (Q2) to turn on; the second switching control circuit setting a charging/discharge current ratio (Di) (=Ib2/Ib1), which is the ratio of the charging current (Ib2) to the discharge current (Ib1) and controlling the on period (ton2) of the second switching element (Q2) such that an on period ratio (Da) (=ton2/ton1), which is a ratio of the on period (ton2) of the second switching element (Q2) with respect to an on period (ton1) of the first switching element (Q1), remains substantially constant with respect to changes in the load current.

For example, the second switching control circuit causes the second switching element (Q2) to be turned on via the turn on signal transmitting circuit due to a voltage generated in the high-side driving winding (nb2), turning off of the first switching element (Q1) serving as a trigger, sets the charging/discharge current ratio (Di) to be substantially one and controls the on period of the second switching element (Q2) such that the on period ratio (Da) remains substantially one with respect to changes in the load current.

For example, the second switching control circuit causes the second switching element Q2 to be turned on via the turn on signal transmitting circuit due to a voltage generated in the high-side driving winding (nb2), turning off of the first switching element (Q1) serving as a trigger, performs setting such that Di is larger than ns·Vi/np·Vo, where Di denotes the charging/discharge current ratio, Vi denotes the direct current input voltage, Vo denotes the output voltage, np denotes the number of turns of the primary winding, and ns denotes the number of turns of the secondary winding, and controls the on period of the second switching element (Q2) such that the on period ratio (Da) remains substantially constant with respect to changes in the load current.

For example, the bidirectional constant current circuit includes a constant current circuit including an operational amplifier. For example, the bidirectional constant current circuit includes a constant current circuit including a transistor circuit in which the base of a first transistor (Q11) is connected to the collector of a second transistor (Q12) and the emitter of the first transistor (Q11) is connected to the base of the second transistor (Q12).

For example, the bidirectional constant current circuit includes a constant current circuit including a Zener diode and a resistor.

For example, the bidirectional constant current circuit preferably includes a diode bridge rectifying circuit including four diodes, and a single constant current circuit that is connected between output terminals of the diode bridge rectifying circuit.

For example, the bidirectional constant current circuit includes a bidirectional constant voltage circuit in which two Zener diodes are reversely connected in series with each other, is input with a voltage of the high-side driving winding (nb2), and generates a bidirectional constant voltage.

For example, a capacitor is connected in parallel with at least one rectifying diode that rectifies a voltage generated in the high-side driving winding (nb2) and makes a current flow through the discharge current setting circuit or the charging current setting circuit.

For example, a resistor is connected in parallel with at least one rectifying diode that rectifies a voltage generated in the high-side driving winding (nb2) so as to cause a current flow through the discharge current setting circuit or the charging current setting circuit.

For example, the transformer (T) includes a low-side driving winding (nb1), one end of the low-side driving winding (nb1) being connected to a low potential side of the direct current power supply input unit, the other end of the low-side driving winding (nb1) being connected such that a direct current power supply voltage is supplied to the first switching control circuit via a second rectifying smoothing circuit.

For example, the first switching control circuit includes a switching element driving circuit that outputs a driving voltage signal that causes the first switching element (Q1) to be turned on when inversion of the voltage polarity of the transformer (T) due to the low-side driving winding (nb1) is detected, a voltage—period conversion circuit that controls a period from turning on of the first switching element (Q1) until turning off of the first switching element (Q1), in accordance with the voltage of a feedback signal generated by detecting the output voltage and comparing the output voltage with a reference voltage (target voltage).

According to various preferred embodiments of the present invention, since a high-voltage IC is not necessary, a reduction in cost is achieved. In addition, the driving circuit and the control circuit of the high-side switching element Q2 are preferably integrated and the second switching control circuit can be provided to include a single transistor (Q3). Consequently, a reduction in cost is achieved.

The second switching control circuit turns the second switching element on such that the ratio of the on period of the second switching element to the on period of the first switching element is substantially constant, and therefore, even when the load current changes and consequently the switching frequency changes, for example, so long as the on period ratio is substantially one, the second switching control circuit can readily cause the first and second switching elements to operate with substantially the same on periods.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

A switching power supply apparatus according to a first preferred embodiment will be described with reference to FIG. 2 and FIG. 3.

Figure 1:
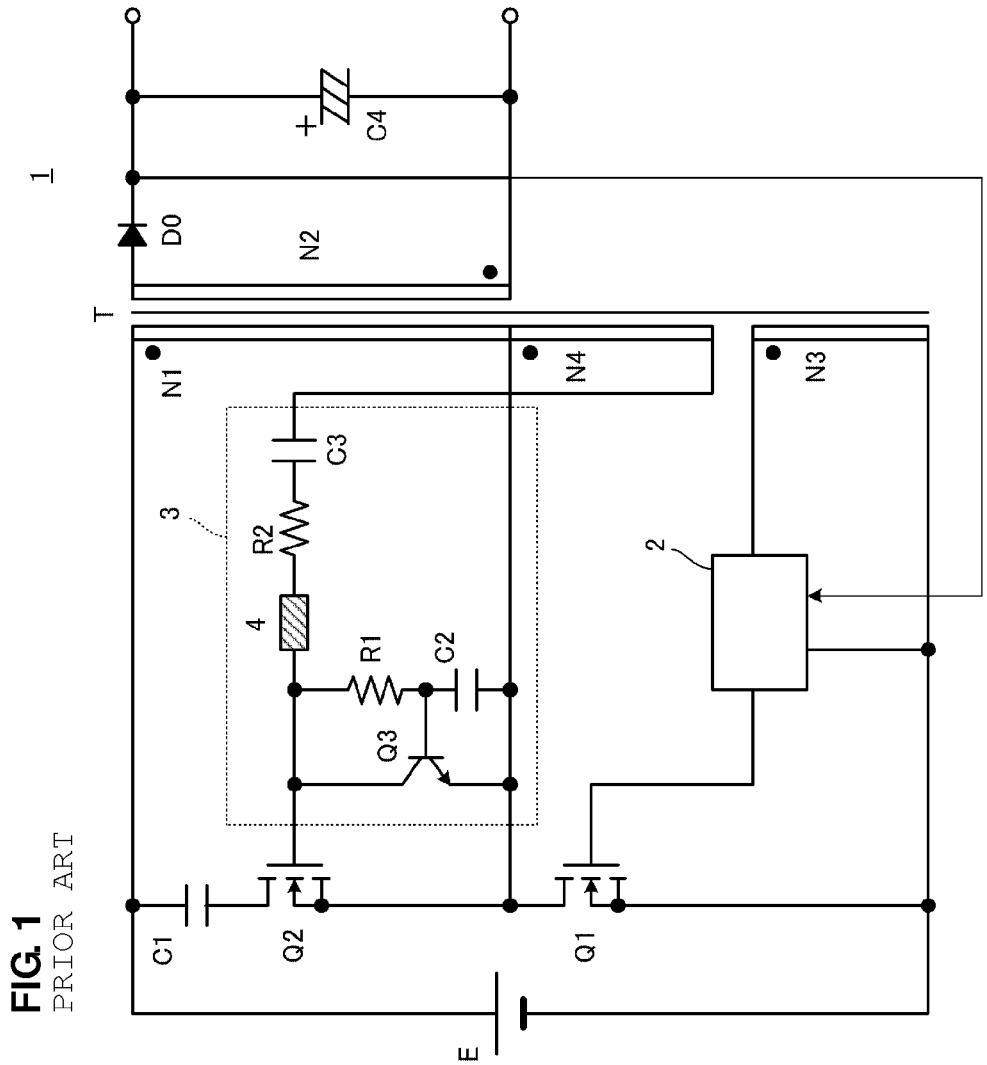
FIG. 1 is a circuit diagram of a switching power supply apparatus described in Japanese Unexamined Patent Application Publication No. 2001-37220.
Figure 2:
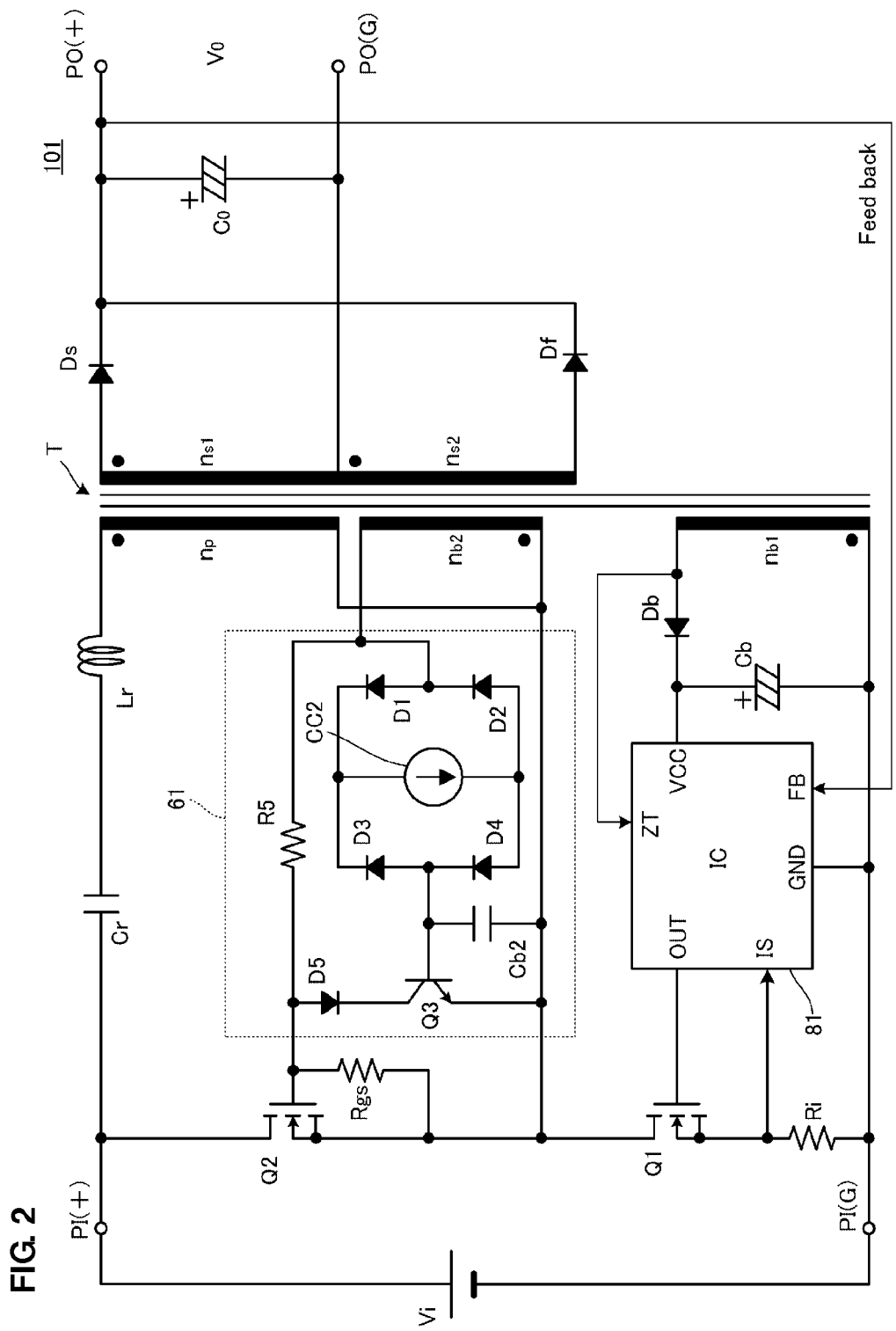
FIG. 2 is a circuit diagram of a switching power supply apparatus 101 according to a first preferred embodiment of the present invention.

FIG. 2 is a circuit diagram of a switching power supply apparatus 101 according to the first preferred embodiment. A direct current input voltage Vi is input between input terminals PI(+) and PI(G) of the switching power supply apparatus 101. A predetermined direct current voltage is output to a load Ro, which is connected between output terminals PO(+) and PO(G) of the switching power supply apparatus 101.

A first series circuit includes a capacitor Cr, an inductor Lr, a primary winding np of a transformer T, a first switching element Q1 and a current detection resistor Ri connected in series with one another between the input terminals PI(+) and PI(G). The first switching element Q1 includes a FET, with the drain terminal thereof being connected to the primary winding np of the transformer T and the source terminal thereof being connected to the direct current detection resistor Ri.

A second series circuit includes a second switching element Q2, the capacitor Cr and the inductor Lr connected in series between the two ends of the primary winding np of the transformer T.

A first rectifying smoothing circuit, which includes diodes Ds and Df and a capacitor Co, is provided at secondary windings ns1 and ns2 of the transformer T. This first rectifying smoothing circuit full-wave rectifies and smoothes an alternating current voltage output from the secondary windings ns1 and ns2 and outputs the voltage to the output terminals PO (+) and PO(G).

A rectifying smoothing circuit including a diode Db and a capacitor Cb is connected to a low-side driving winding nb1 of the transformer T. A direct current voltage obtained by this rectifying smoothing circuit is supplied to a GND terminal and a VCC terminal of a switching control IC 81 as a power supply voltage.

The switching control IC 81 corresponds to a first switching control circuit of a preferred embodiment of the present invention. The switching control IC 81 includes a switching element driving circuit that outputs a driving voltage to the gate of the first switching element Q1 from an OUT terminal thereof. The first switching element Q1 is turned on and off in accordance with the driving voltage.

A second switching control circuit 61 is provided between a high-side driving winding nb2 of the transformer T and the second switching element Q2. Specifically, a first end of the high-side driving winding nb2 of the transformer T is connected to a connection point (source terminal of second switching element Q2) between the first switching element Q1 and the second switching element Q2, and the second switching control circuit 61 is connected between a second end of the high-side driving winding nb2 and the gate terminal of the second switching element Q2. A resistor Rgs is connected between the gate terminal and the source terminal of the switching element Q2.

After turning on the second switching element Q2, the second switching control circuit 61 forcibly turns the second switching element Q2 off after a period of time equal to the on period of the first switching element Q1 has elapsed.

A feedback circuit is provided between the output terminals PO (+) and PO(G) and the switching control IC 81. However, in FIG. 2, for simplicity, only the path of the feedback is illustrated with a single line (Feed back). Specifically, the feedback circuit generates a feedback signal by comparing a partial voltage value between the output terminals PO(+) and PO(G) and a reference voltage and then inputting a feedback voltage to an FB terminal of the switching control IC 81 in an isolated state.

Upon detecting inversion of the voltage polarity of the transformer T due to the low-side driving winding nb1, the switching control IC 81 outputs a driving voltage signal that causes the first switching element Q1 to be turned on. Furthermore, a voltage-period conversion circuit is provided that controls an on period from when the first switching element Q1 is turned on until when the first switching element Q1 is turned off in accordance with the voltage of the feedback signal generated by detecting an output voltage to a load and comparing it with a reference voltage (target voltage).

The second switching control circuit 61 is a bidirectional constant current circuit including a diode bridge rectifier circuit preferably including four diodes D1, D2, D3 and D4 and a constant current circuit CC2 that is connected between output terminals of the diode bridge rectifier circuit.

When the first switching element Q1 is turned on, due to a negative voltage induced in the high-side driving winding nb2, the capacitor Cb2 discharges in a negative direction with a constant current along a path of capacitor Cb2→the diode D3→the constant current circuit CC2→the diode D2→the high-side driving winding nb2.

After that, when the first switching element Q1 is turned off, a positive voltage is applied to the second switching element Q2 via a resistor R5, due to a positive voltage induced in the high-side driving winding nb2, and Q2 is turned on. In addition, the capacitor Cb2 is charged with a constant current in a positive direction along the path high-side driving winding nb2→diode D1→constant current circuit CC2→diode D4→capacitor Cb2. The transistor Q3 is turned on at a point in time at which the voltage of the capacitor Cb2 exceeds approximately 0.6 V, for example, which is the threshold voltage of the transistor, and consequently the second switching element Q2 is turned off.

As a result of the above-described operation, the discharge period of the capacitor Cb2, that is, the on period of the first switching element Q1 and the charging period of the capacitor Cb2, that is, the on period of the second switching element Q2 come to be the same.

The resistor Rgs, which is connected between the gate terminal and the source terminal of the second switching element Q2 is provided so as to adjust the value of the voltage applied between the gate and source of the second switching element Q2 and to discharge residual charge, but if the resistor Rgs is not used, the basic operation is not greatly affected.

Figure 3:
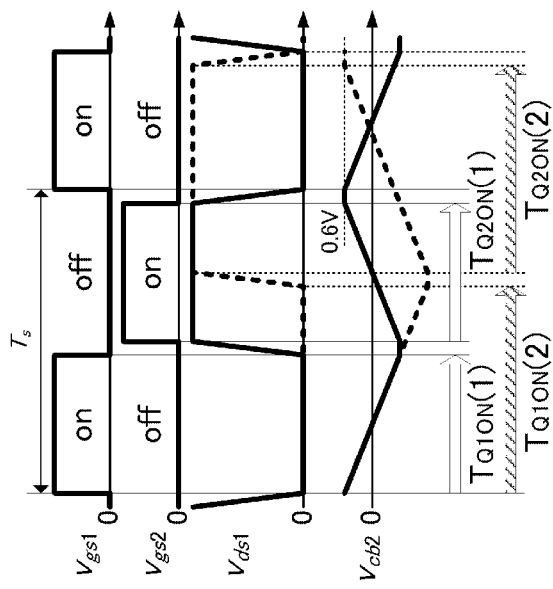
FIG. 3 is a waveform diagram illustrating the relationships between the gate-source voltage Vgs1 of the first switching element Q1, the gate-source voltage Vgs2 of the second switching element Q2, the drain-source voltage Vds1 of the first switching element Q1 and the voltage of a capacitor Cb2.

FIG. 3 is a waveform diagram illustrating the relationships between the gate-source voltage Vgs1 of the first switching element Q1, the gate-source voltage Vgs2 of the second switching element Q2, the drain-source voltage Vds1 of the first switching element Q1 and the voltage of the capacitor Cb2.

When the first switching element Q1 is turned on, a negative voltage is induced in the high-side driving winding nb2 and the charging voltage VCb2 of the capacitor Cb2 falls from approximately 0.6 V, for example, which is the threshold voltage. After that, when the first switching element Q1 is turned off, a positive voltage is induced in the high-side driving winding nb2 and the charging voltage VCb2 of the capacitor Cb2 rises. When the charging voltage VCb2 of the capacitor Cb2 exceeds approximately 0.6 V, for example, which is the threshold voltage, the transistor Q3 is turned on. Thus, the gate potential of the second switching element Q2 becomes 0 V and the second switching element Q2 is turned off. The capacitor Cb2 is charged with a constant current having the same current value and therefore the slope of the charging voltage VCb2 is the same. That is, the charging-discharging ratio is 1:1. Consequently, the on period of the second switching element Q2 is the same as the on period of the first switching element Q1.

In FIG. 3, $T_{Q1ON}(1)$ and $T_{Q2ON}(1)$ come to be the same as each other through the above-described operation. Here, when the on period of the first switching element Q1 becomes longer and becomes equal to $T_{Q1ON}(2)$, Vds1 and VCb2 come to have waveform diagrams illustrated by the dotted lines. In FIG. 3, $T_{Q1ON}(2)$ and $T_{Q2ON}(2)$ come to be the same as each other through the above-described operations.

Figure 4:
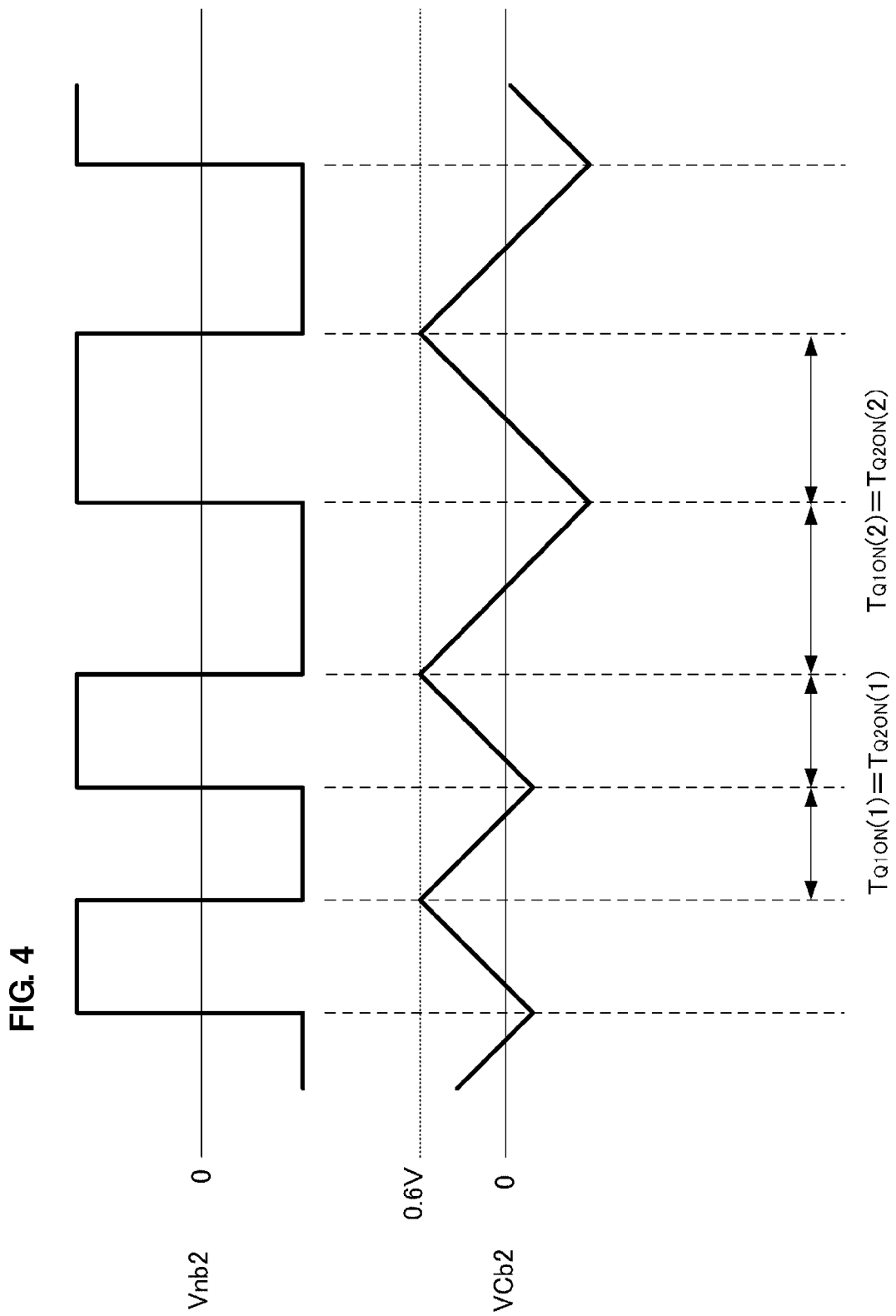
FIG. 4 is a waveform diagram illustrating the relationship between a voltage Vnb2 of a high-side driving winding nb2 and a voltage VCb2 of the capacitor Cb2.

FIG. 4 is a waveform diagram illustrating the relationship between the voltage Vnb2 of the high-side driving winding nb2 and the voltage VCb2 of the capacitor Cb2.

In this way, when the on period of the first switching element Q1 changes, the on period of the second switching element Q2 changes in line with this change.

As a result of charge of the capacitor Cb2 being discharged, although a reverse bias voltage is applied across the base and emitter of the transistor Q3, since there is normally a withstand voltage of up to around −5 V and a design margin is considered, charging and discharging can be performed in a wide range of about −4 V to about 0.6 V, for example. If the width of voltage variation in the capacitor Cb2 is made large, the tolerance to disturbance noise can be increased, the error in the scattering of temperature changes and electrical characteristics of components and so forth can be decreased and operation can be stably performed.

According to the first preferred embodiment, the following effects are obtained.

The first switching element Q1 and the second switching element Q2 can be made to be alternately turned on and off with symmetrical waveforms with substantially equal on periods.

Circuits that detect the on period of the first switching element Q1 and that turn on and turn off the switching element Q2 can be integrated with one another and as a result a second switching control circuit can be made to have a significantly reduced number of discrete components.

The potential of the ground terminal of the second switching element Q2 connected to the primary winding of the transformer T is changed by switching of the first switching element Q1, and the second switching control circuit 61 is a circuit that operates by using an alternating current voltage generated in the high-side driving winding nb2 and therefore it is not likely that erroneous operation will occur despite the variations in the potential of the ground terminal.

The first switching element Q1 and the second switching element Q2 are turned on by using a change in voltage generated by a transformer winding as a trigger and alternately operate in on and off states with a minimum dead time therebetween. That is, high reliability can be secured without having both of the switching elements turned on simultaneously. In addition, the dead time takes a minimum value at which zero voltage switching (ZVS) can be achieved and therefore high power conversion efficiency is obtained.

Second Preferred Embodiment

Figure 5:
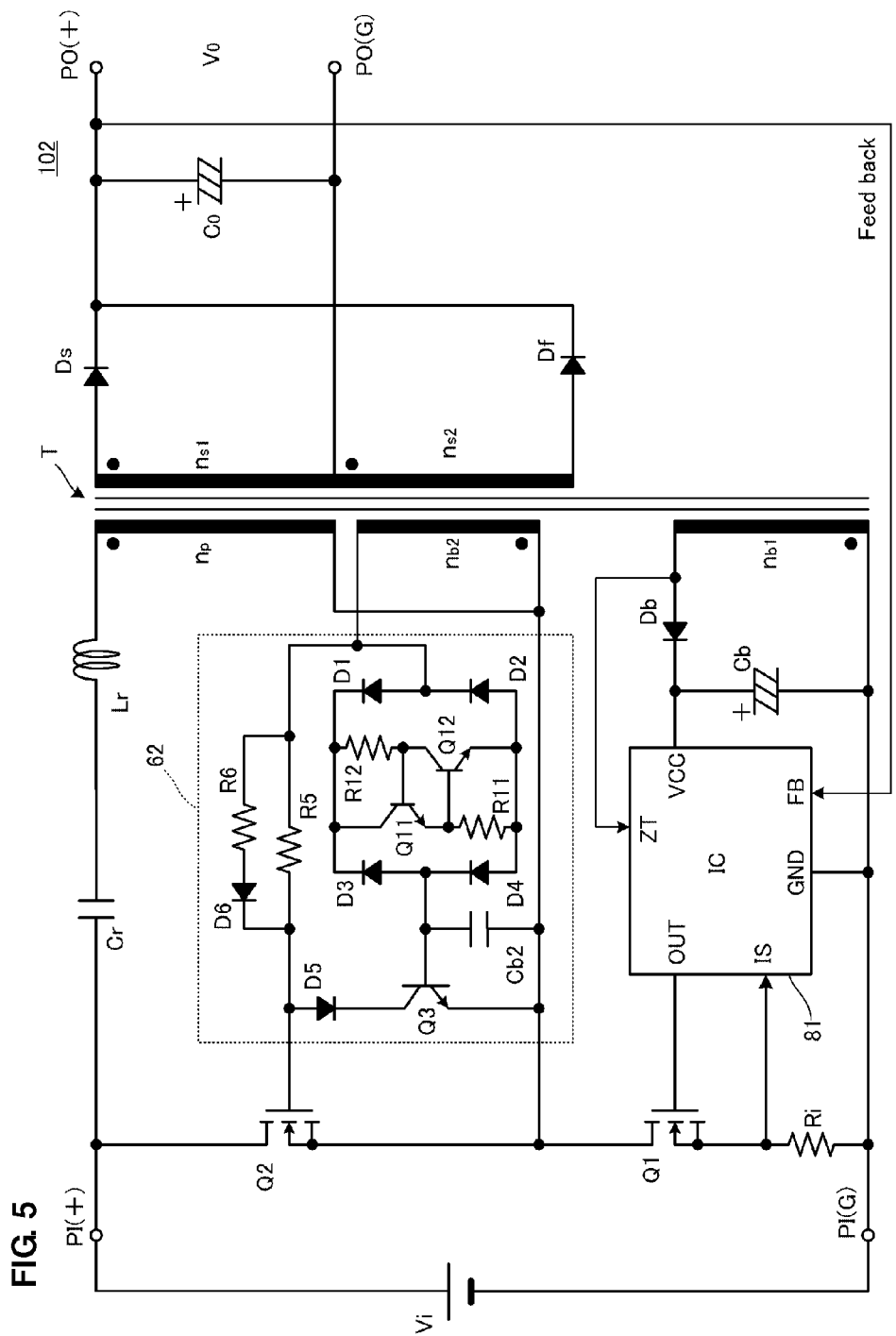
FIG. 5 is a circuit diagram of a switching power supply apparatus 102 according to a second preferred embodiment of the present invention.

FIG. 5 is a circuit diagram of a switching power supply apparatus 102 according to a second preferred embodiment.

The configuration of a second switching control circuit 62 of the switching power supply apparatus 102 differs from that of the switching power supply apparatus 101 illustrated in FIG. 2. The constant current circuit in the example of FIG. 5 will be more specifically described. That is, a single constant current circuit is preferably formed by connecting the base of a first transistor Q11 to the collector of a second transistor Q12, connecting the emitter of the first transistor Q11 to the base of the second transistor Q12, connecting a resistor R12 between the collector and the base of the first transistor Q11 and connecting a resistor R11 between the emitter and the base of the second transistor Q12.

With this configuration, a second switching control circuit is made to have a significantly reduced number of discrete components.

In the example illustrated in FIG. 5, a series circuit including a resistor R6 and a diode D6 is connected in parallel with the resistor R5. Accordingly, a difference in impedance can be provided by changing between a charging path that exists when the second switching element Q2 is turned on as a result of the input capacitance of the second switching element Q2 being charged with charge due to a voltage generated in the high-side driving winding nb2 and a discharge path that exists when charge is discharged from the input capacitance of the second switching element Q2. Consequently, a configuration can be designed such that a delay period from the time point when a change in voltage in the high-side driving winding nb2 is generated can be adjusted and the second switching element Q2 can be turned on at an optimal timing.

Third Preferred Embodiment

Figure 6:
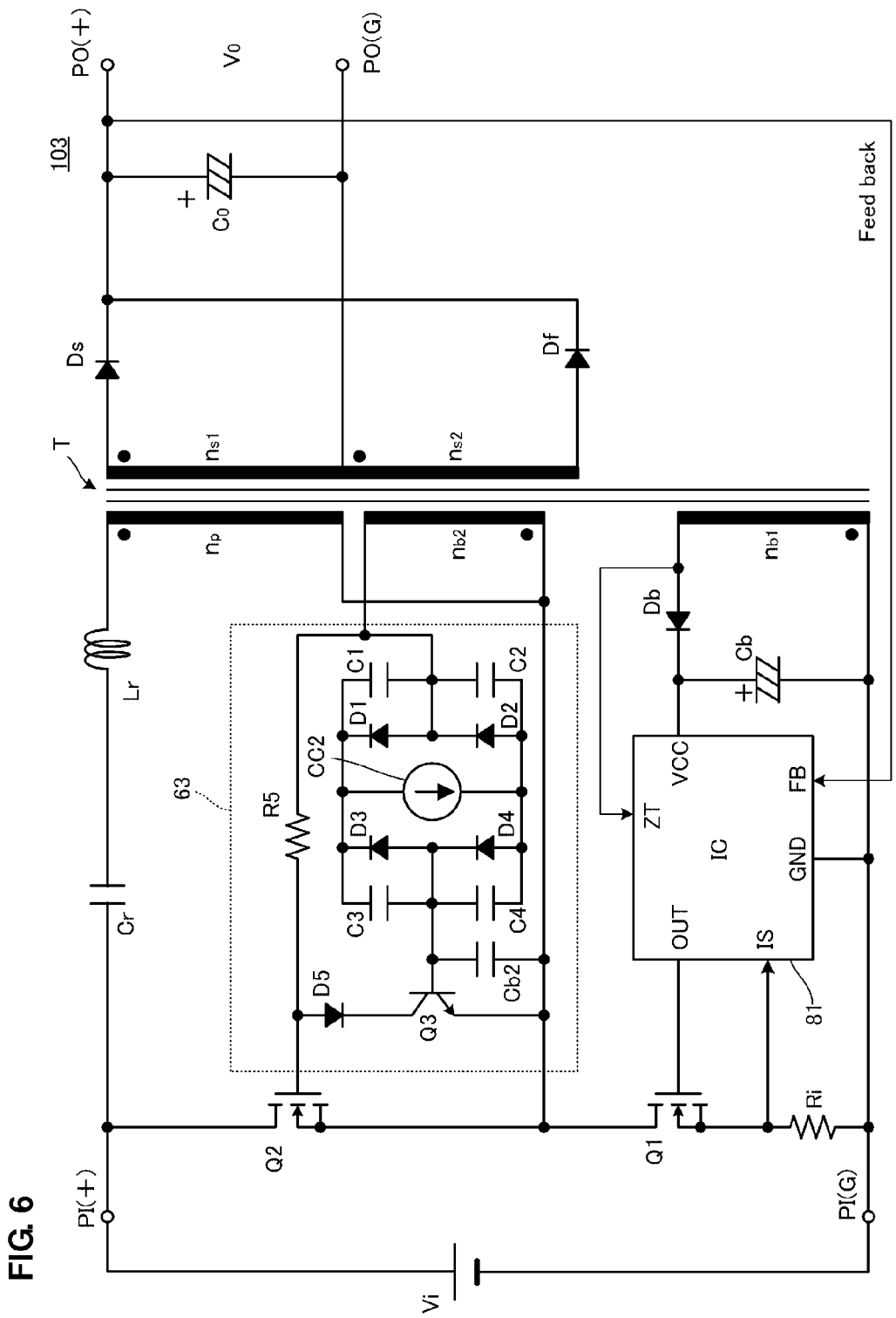
FIG. 6 is a circuit diagram of a switching power supply apparatus 103 according to a third preferred embodiment of the present invention.

FIG. 6 is a circuit diagram of a switching power supply apparatus 103 according to a third preferred embodiment.

The configuration of a second switching control circuit 63 of the switching power supply apparatus 103 differs from that of the switching power supply apparatus 101 illustrated in FIG. 2. In this example, capacitors C1, C2, C3 and C4 are connected in parallel with diodes D1, D2, D3 and D4, respectively.

Thus, as a result of capacitors being connected in parallel with diodes that rectify an input/output current of the constant current circuit CC2, in a period in which a reverse direction voltage is applied to the rectifying diodes, charge accumulates in the capacitors C1, C2, C3 and C4 and in a dead time during which the voltage of the high-side driving winding nb2 changes, the charge that has accumulated in the capacitors C1, C2, C3 and C4 can be discharged and a current can accordingly flow having a phase that leads that of the diodes. In this way, it is possible to adjust the amount of current charged to and discharged from the capacitor Cb2 and, using the capacitors C1, C2, C3 and C4, it is possible to correct distortion of the charging/discharge current occurring during the dead time, particularly when the direction of the charging/discharge current to/from the capacitor Cb2 changes. It is not necessary for a capacitor to be connected in parallel with all of the diodes D1 to D4, and provided that a capacitor is connected in parallel with at least one of the diodes, distortion of the charging/discharge current can be corrected.

Fourth Preferred Embodiment

Figure 7:
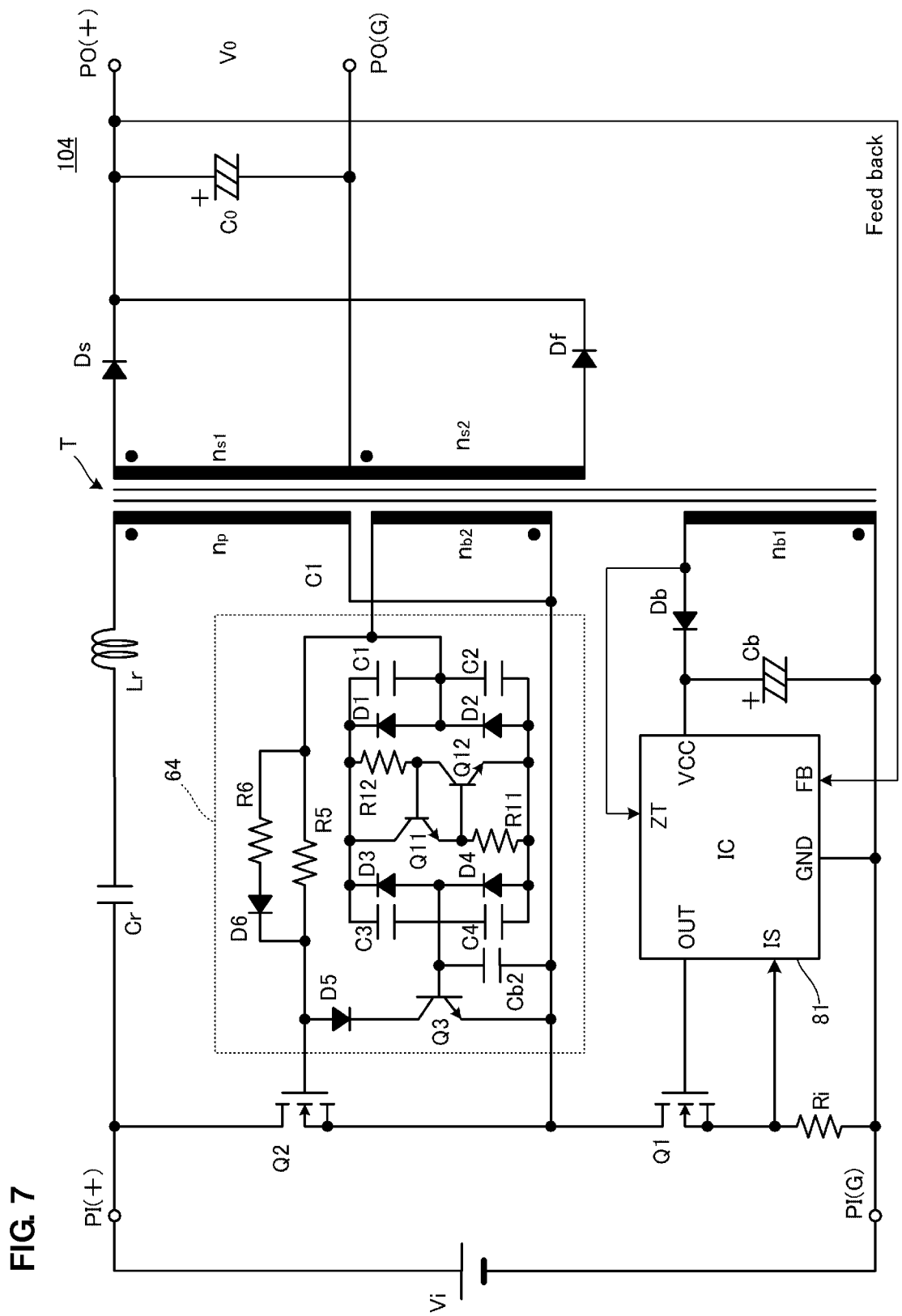
FIG. 7 is a circuit diagram of a switching power supply apparatus 104 according to a fourth preferred embodiment of the present invention.

FIG. 7 is a circuit diagram of a switching power supply apparatus 104 according to a fourth preferred embodiment.

The configuration of a second switching control circuit 64 of the switching power supply apparatus 104 differs from that of the switching power supply apparatus 102 illustrated in FIG. 5. In this example, capacitors C1, C2, C3 and C4 are connected in parallel with diodes D1, D2, D3 and D4, respectively.

Thus, as a result of capacitors being connected in parallel with diodes that rectify an input/output current of a constant current circuit including transistors Q11 and Q12, in a period in which a reverse direction voltage is applied to the rectifying diodes, charge accumulates in the capacitors C1, C2, C3 and C4 and in a dead time during which the voltage of the high-side driving winding nb2 changes, the charge that has accumulated in the capacitors C1, C2, C3 and C4 can be discharged and a current can accordingly flow having a phase that leads that of a current in the case where only rectifying diodes are used. In this way, it is possible to adjust the amount of current charged to and discharged from the capacitor Cb2 and, using the capacitors C1, C2, C3 and C4, it is possible to correct distortion of the charging/discharge current occurring during the dead time, particularly when the direction of the charging/discharge current to/from the capacitor Cb2 changes.

Fifth Preferred Embodiment

Figure 8:
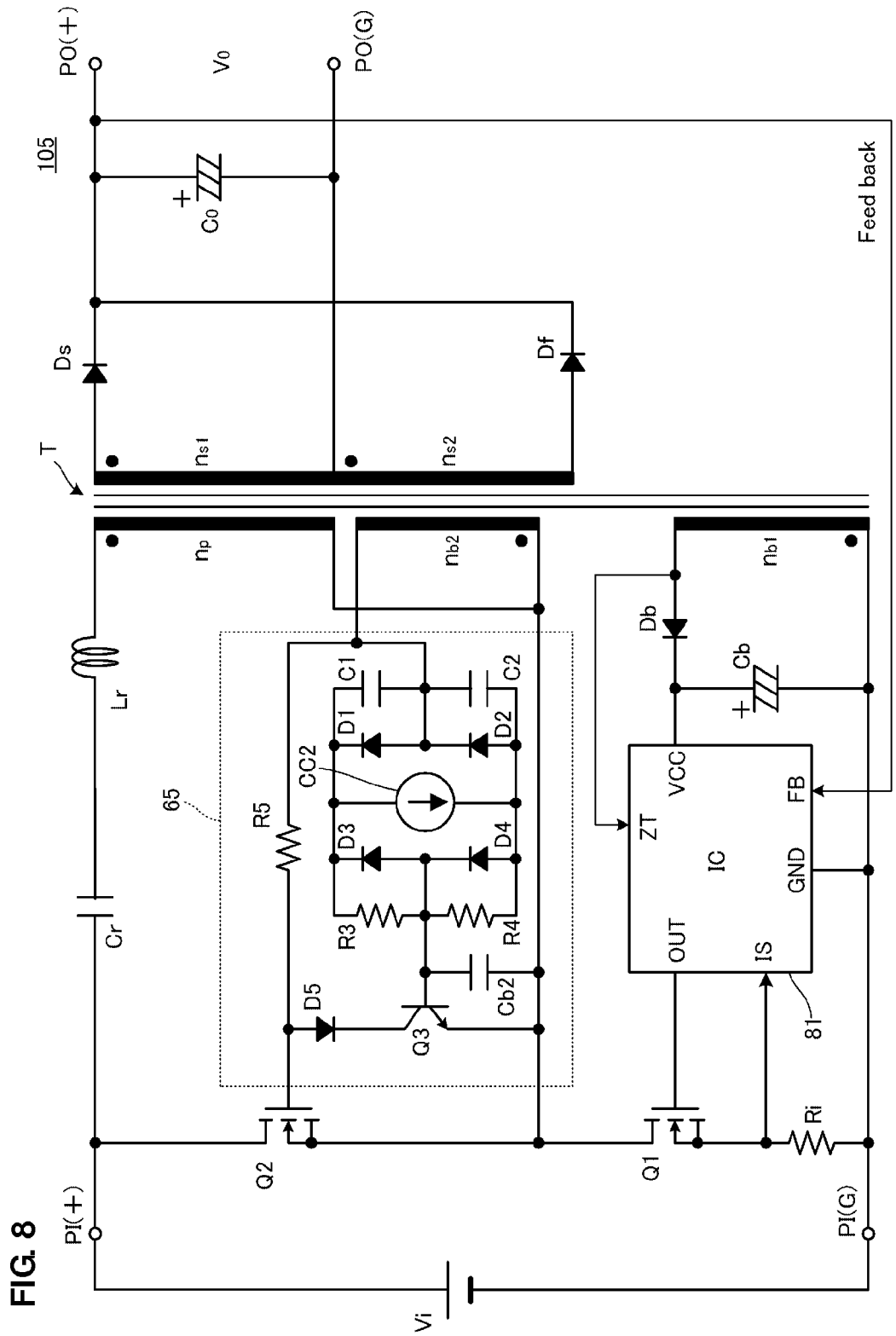
FIG. 8 is a circuit diagram of a switching power supply apparatus 105 according to a fifth preferred embodiment of the present invention.

FIG. 8 is a circuit diagram of a switching power supply apparatus 105 according to a fifth preferred embodiment.

The configuration of a second switching control circuit 65 of the switching power supply apparatus 105 differs from that of the switching power supply apparatus 101 illustrated in FIG. 2. In this example, capacitors C1 and C2 are connected in parallel with diodes D1 and D2, respectively. In addition, resistors R3 and R4 are connected in parallel with diodes D3 and D4, respectively.

The impedances (time constants) of the charging path and the discharge path for the capacitor Cb2 can be made to differ from each other by making the resistances of the resistors R3 and R4 differ from each other. Consequently, differences between some of the on periods of the first switching element Q1 and the second switching element Q2 can be corrected. In addition, differences between some of the on periods that are necessary when the input voltage or the output voltage has changed, can be corrected using the resistors R3 and R4. That is, the resistances are adjusted using the resistors R3 and R4 by utilizing a change in the voltage of the high-side driving winding nb2. Correction for when the input/output voltage has changed is performed by a current determined by the voltage of the high-side driving winding nb2 and the resistor R3 or the resistor R4 being by adding and superposed onto the current determined by the constant current circuit and that current being made to serve as the charging or discharge current of the capacitor Cb2. In this way, the on periods of the first switching element Q1 and the second switching element Q2 can be made equal to each other with a higher degree of accuracy. It is sufficient for a resistor to be connected in parallel with at least one of the diodes D1 to D4. In places where no resistor is connected in parallel with a diode, instead, a capacitor may or may not be connected.

Sixth Preferred Embodiment

Figure 9:
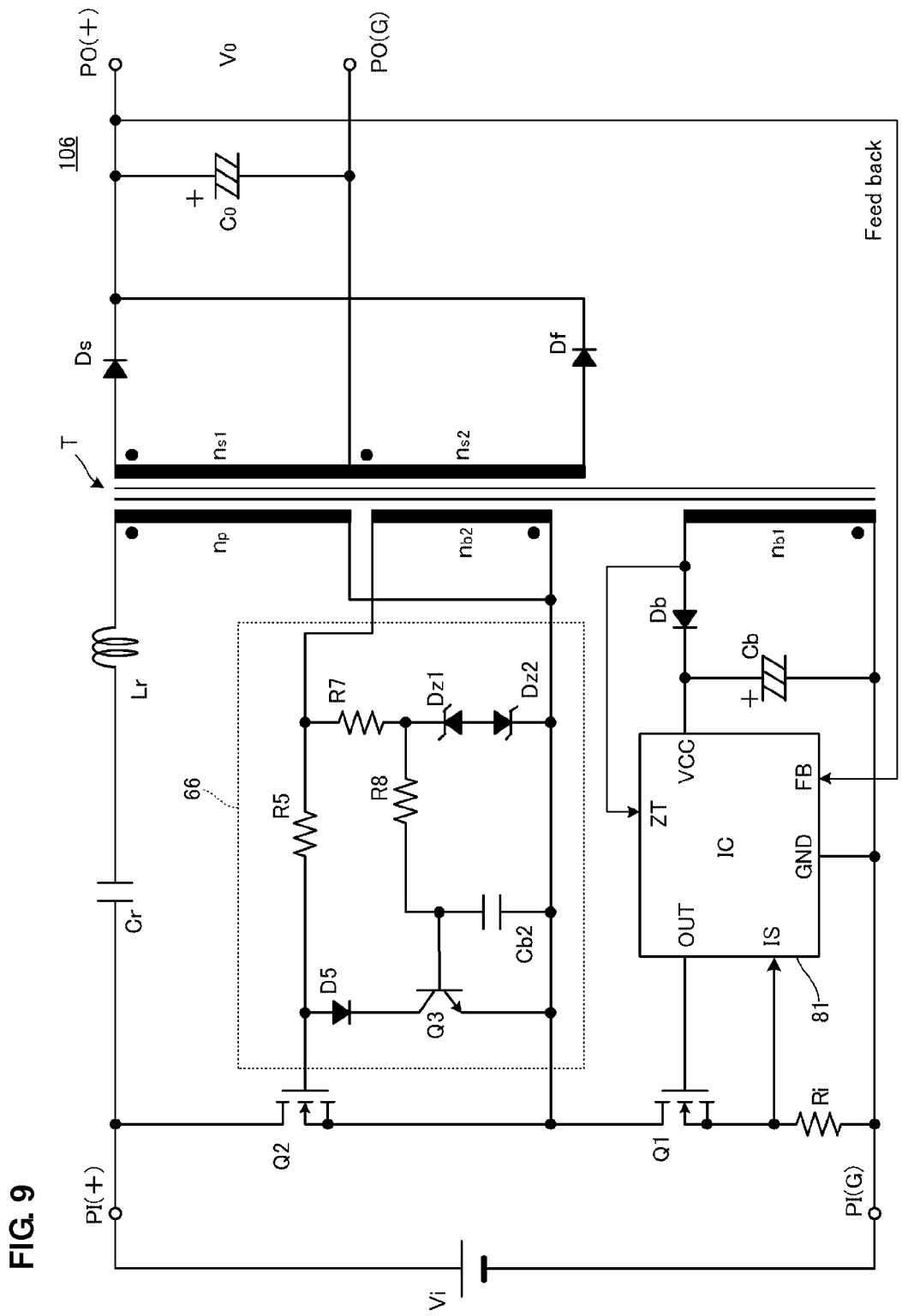
FIG. 9 is a circuit diagram of a switching power supply apparatus 106 according to a sixth preferred embodiment of the present invention.

FIG. 9 is a circuit diagram of a switching power supply apparatus 106 according to a sixth preferred embodiment.

The configuration of a second switching control circuit 66 of the switching power supply apparatus 106 differs from that of the switching power supply apparatus described in the first to fifth preferred embodiments. In this example, a circuit is provided in which two Zener diodes Dz1 and Dz2 are reversely connected in series with each other and a resistor R7 is further connected in series with the diodes. This circuit is input with the output voltage of the high-side driving winding nb2 and generates a bidirectional constant voltage. The voltage across the two ends of the serially connected Zener diodes Dz1 and Dz2 is applied to a charging/discharge circuit including the capacitor Cb2 and a resistor R8.

Since the charging and discharge currents of the capacitor Cb2 are made equal to each other, specifically, the Zener voltages of the two Zener diodes Dz1 and Dz2 are equal to each other.

Figure 10:
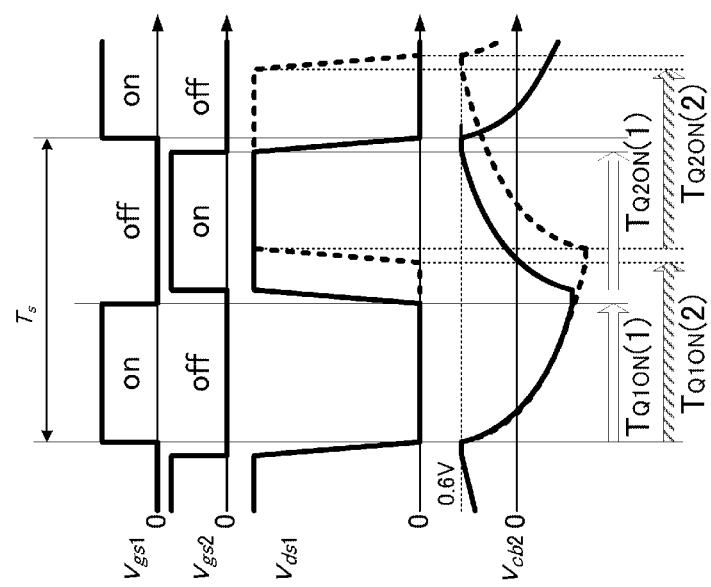
FIG. 10 is a waveform diagram illustrating the relationships between the gate-source voltage Vgs1 of the first switching element Q1, the gate-source voltage Vgs2 of the second switching element Q2, the drain-source voltage Vds1 of the first switching element Q1 and the voltage Vcb2 of the capacitor Cb2 in FIG. 9.

FIG. 10 is a waveform diagram illustrating the relationships between the gate-source voltage Vgs1 of the first switching element Q1, the gate-source voltage Vgs2 of the second switching element Q2, the drain-source voltage Vds1 of the first switching element Q1 and the voltage Vcb2 of the capacitor Cb2 in FIG. 9.

First, when the first switching element Q1 is turned on, a negative voltage induced in the high-side driving winding nb2 is changed to a constant voltage by a series circuit including the Zener diodes Dz1 and Dz2 and the resistor R7 and this voltage is applied to the time constant circuit including the capacitor Cb2 and the resistor R8.

After that, when the first switching element Q1 is turned off, a positive voltage induced in the high-side driving winding nb2 is applied to the second switching element Q2 via the resistor R5 and Q2 is turned on. In addition, the positive voltage induced in the high-side driving winding nb2 is changed into a constant voltage by the series circuit including the Zener diodes Dz1 and Dz2 and the resistor R7 and this stabilized positive voltage is applied to the time constant circuit including the capacitor Cb2 and the resistor R8.

The transistor Q3 is turned on at a point in time at which the voltage of the capacitor Cb2 exceeds approximately 0.6 V, for example, and consequently the second switching element Q2 is turned off.

As a result of the above-described operations, the charging period of the capacitor Cb2, that is, the on period of the first switching element Q1 and the discharge period of the capacitor Cb2, that is, the on period of the second switching element Q2 come to be substantially the same.

In FIG. 10, $T_{Q1ON}(1)$ and $T_{Q2ON}(1)$ come to be the same as each other due to the above-described operations. Here, when the on period of the first switching element Q1 becomes longer and becomes equal to $T_{Q1ON}(2)$, Vds1 and VCb2 come to have waveform diagrams illustrated by the dotted lines. In FIG. 3, $T_{Q1ON}(2)$ and $T_{Q2ON}(2)$ come to be the same as each other through the above-described operations.

Seventh Preferred Embodiment

Figure 11:
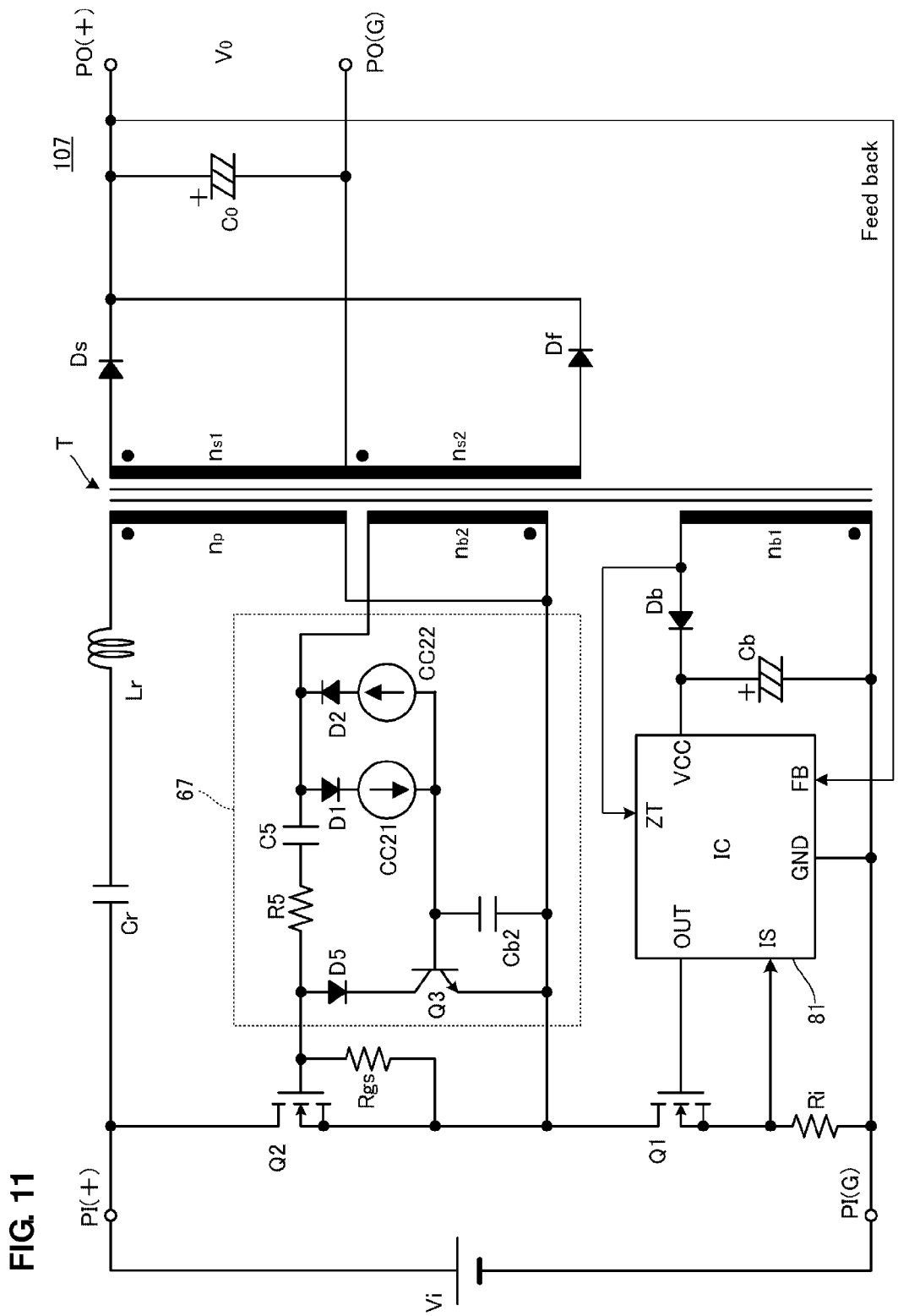
FIG. 11 is a circuit diagram of a switching power supply apparatus 107 according to a seventh preferred embodiment of the present invention.

FIG. 11 is a circuit diagram of a switching power supply apparatus 107 according to a seventh preferred embodiment.

In the first to sixth preferred embodiments, the on period ratio Da $(=T_{Q2ON}/T_{Q1ON})=1$, whereas the seventh preferred embodiment is an example corresponding to a case in which the on period ratio Da $(=T_{Q2ON}/T_{Q1ON}) \neq 1$.

The configuration of a second switching control circuit 67 of the switching power supply apparatus 107 differs from that of the switching power supply apparatus described in the first preferred embodiment. In this example, two constant current circuits CC21 and CC22, reverse-current protection diodes D1 and D2, and a capacitor C5 are provided.

When the first switching element Q1 is turned on, due to a voltage induced in the high-side driving winding nb2, the capacitor Cb2 discharges in a negative direction with a constant current along the path of capacitor Cb2→the constant current circuit CC22→the diode D2→the high-side driving winding nb2.

After that, when the first switching element Q1 is turned off, a positive voltage is applied to the second switching element Q2 via the resistor R5 and the capacitor C5 due to a positive voltage induced in the high-side driving winding nb2, and Q2 is turned on. In addition, the capacitor Cb2 is charged in a positive direction with a constant current along the path of the high-side driving winding nb2→the diode D1→the constant current circuit CC21→the capacitor Cb2. The transistor Q3 is turned on at a point in time at which the voltage of the capacitor Cb2 exceeds approximately 0.6 V, for example, and consequently the second switching element Q2 is turned off.

The charging current and the discharge current of the capacitor Cb2 are determined independently from each other and therefore the discharge period of the capacitor Cb2, that is, the on period of the first switching element Q1, and the charging period of the capacitor Cb2, that is, the on period of the second switching element Q2, are different. However, the ratio between the charging period and the discharge period of the capacitor Cb2 is constant and has a proportional relationship (linear) with the on period of the first switching element Q1. Consequently, the on period ratio Da $(=T_{Q2ON}/T_{Q1ON})$ remains constant in a predetermined relationship.

Here, for example, it is assumed that the power conversion circuit has a circuit configuration in which a flyback converter is utilized. In addition, a case will be discussed in which a current, which flows through the transformer, is made to behave in a current boundary mode, due to the switching element Q1 being turned on by use of inversion of the transformer voltage as a result of the reset period of the transformer finishing after the switching element Q2 is turned off.

When the current is made to behave in the current boundary mode, zero voltage switching can be easily achieved, loss that occurs with the reverse recovery period of secondary-side rectifying diodes can be reduced, and highly efficient operation can be achieved for specific design conditions. However, there is a great difficulty in the related art, in that, when the current is made to behave in the current boundary mode as in a ringing choke converter (RCC), the on period of the switching element Q1 greatly changes with variations in load, the on period of the switching element Q2 changes along with this change and the switching period is changed. In this preferred embodiment, this issue is solved in the following way.

In FIG. 11, when the direct current input voltage is denoted by Vi, the output voltage by Vo, the number of turns of the primary winding by np, and the number of turns of the secondary winding by ns, the relationship ts·Vi/np=tr·Vo/ns holds true between the period is during which the transformer is excited and the period tr during which the transformer is reset due to the continuity of the magnetic flux of the transformer. Therefore, the ratio of the period tr during which the transformer is reset with respect to the period is during which the transformer is excited can be expressed as tr/ts=(ns·Vi)/(np·Vo).

Here, the product of $T_{Q1ON} \cdot Ib1$ of the charging period $T_{Q1ON}$ of the capacitor Cb2 and the discharge current Ib1 is the amount of charge discharged. Similarly, the amount of charge charged is expressed as $T_{Q2ON} \cdot Ib2$. In a normal state, the amount of charge discharged and the amount of charge charged are the same and therefore $T_{Q1ON} \cdot Ib1 = T_{Q2ON} \cdot Ib2$ holds true. Therefore, the on period ratio $Da = T_{Q2ON}/T_{Q1ON} = Ib1/Ib2 = 1/Di$ holds true.

If setting is performed such that Di(=1/Da)>(tr/ts), that is, Da<(tr/ts), even when the on period $T_{Q1ON}$ of the switching element Q1 changes, the on period $T_{Q2ON}$ of the switching element Q2 is much shorter than the reset period tr of the transformer. If setting is performed in this way, as a result of the reset period of the transformer finishing after the switching element Q2 is turned off, a current, which flows through the transformer, can be made to behave in a current boundary mode, due to the switching element Q1 being turned on by use of inversion of the transformer voltage due to the resetting of the transformer finishing. In addition, also in the case where the on period of the switching element Q1 greatly changes with changes in load, the on period of the switching element Q2 changes along with this change and behavior of the current in the current boundary mode can be realized.

That is, in this preferred embodiment, a relationship of Di=1/Da holds true between the charging/discharge current ratio Di (=Ib2/Ib1) and the on period ratio Da (=$T_{Q2ON}/T_{Q1ON}$), Di being set so as to be larger than (ns·Vi)/(np·Vo), and the on period of the second switching element Q2 being controlled such that the on period ratio (Da) remains substantially constant with changes in load current, such that the converter is made to operate in a current boundary mode and even when the on period of the switching element Q1 changes with changes in load and the switching period changes, zero voltage switching can be achieved and loss that occurs with the reverse recovery period of the rectifying diode can be reduced.

In this way, a high-side on period that appropriately complies with the low-side on period can be generated with a normally constant ratio and therefore a circuit system in which the high-side and low-side on periods need not be constant (for example, the above-described flyback system or a forward system) can also be used.

Figure 12:
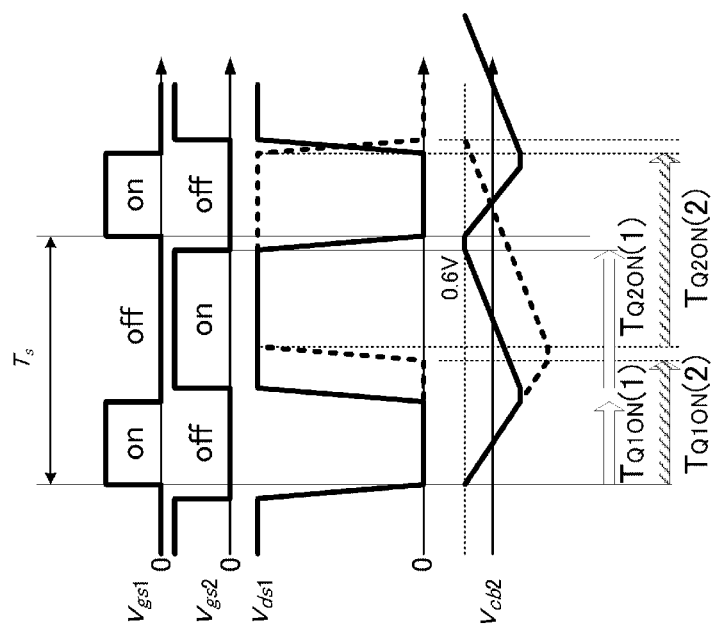
FIG. 12 is a waveform diagram illustrating the relationships between the gate-source voltage Vgs1 of the first switching element Q1, the gate-source voltage Vgs2 of the second switching element Q2, the drain-source voltage Vds1 of the first switching element Q1 and the voltage Vcb2 of the capacitor Cb2, in FIG. 11.

FIG. 12 is a waveform diagram illustrating the relationships between the gate-source voltage Vgs1 of the first switching element Q1, the gate-source voltage Vgs2 of the second switching element Q2, the drain-source voltage Vds1 of the first switching element Q1 and the voltage Vcb2 of the capacitor Cb2 in FIG. 11.

When the first switching element Q1 is turned on, a negative voltage is induced in the high-side driving winding nb2 and the charging voltage VCb2 of the capacitor Cb2 decreases from approximately 0.6 V, for example. After that, when the first switching element Q1 is turned off, a positive voltage is induced in the high-side driving winding nb2 and the charging voltage VCb2 of the capacitor Cb2 rises. When the charging voltage VCb2 of the capacitor Cb2 exceeds approximately 0.6 V, for example, the transistor Q3 is turned on. Thus, the gate potential of the second switching element Q2 becomes 0 V and the second switching element Q2 is turned off.

The capacitor Cb2 is charged by the constant current circuit CC21 and is discharged by the constant current circuit CC22, and therefore the slope of the rise of and the slope of the fall of the charging voltage VCb2 are different. However, even if the on period of the first switching element Q1 changes, the slope of the rise of and the slope of the fall of the charging voltage VCb2 each remain constant. Consequently, the on period ratio Da (=$T_{Q2ON}/T_{Q1ON}$) remains constant in a predetermined relationship.

Eighth Preferred Embodiment

Figure 13:
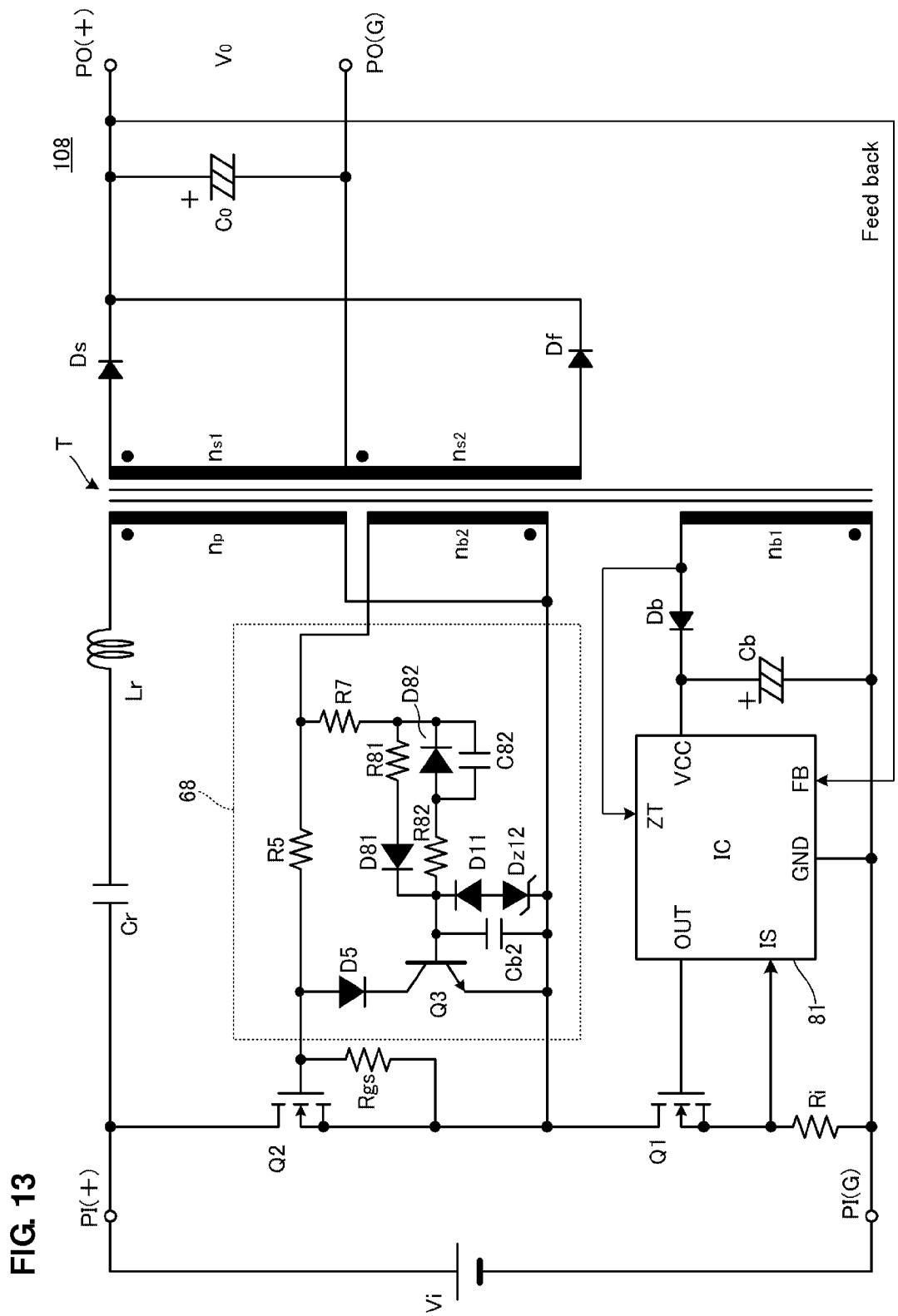
FIG. 13 is a circuit diagram of a switching power supply apparatus 108 according to an eighth preferred embodiment of the present invention.

FIG. 13 is a circuit diagram of a switching power supply apparatus 108 according to an eighth preferred embodiment.

The configuration of a second switching control circuit 68 of the switching power supply apparatus 108 differs from that of the switching power supply apparatus illustrated in FIG. 11. In this example, a series circuit including a resistor R81 and a diode D81 and a series circuit including a resistor R82 and a diode D82 are connected in parallel with each other and the resistor R7 is connected in series with this parallel circuit. This series circuit is connected between the high-side driving winding nb and the capacitor Cb2. In addition, a circuit in which a diode D11 and a Zener diode Dz12 are reversely connected in series with each other is connected to the two ends of the capacitor Cb2.

With this circuit configuration, the output voltage of the high-side driving winding nb2 is input and a bidirectional constant voltage is generated. However, the charging current of the capacitor Cb2 passes through the resistor R81 and the discharge current passes through the resistor R82, and therefore the charging time constant and the discharge time constant of the capacitor Cb2 are different.

By connecting a capacitor C82 in parallel with the diode D82, the charging time constant and the discharge time constant for the capacitor Cb2 are made to be different from each other by the capacitor C82. In the period in which a reverse direction voltage is applied to the diode D82, charge accumulates in the capacitor C82, and in the dead time in which the voltage of the high-side driving winding changes, the charge accumulated in the capacitor C82 can be discharged and a current can effectively flow that has a phase leading that in the case where only a rectifying diode is used. In this way, it is possible to adjust the amount of current charged to and discharged from the capacitor Cb2 and it is possible to correct distortion of the charging/discharge current using the capacitor occurring during the dead time particularly when the direction of the charging/discharge current to/from the capacitor Cb2 changes.

In addition, a circuit which is connected to the two ends of the capacitor Cb2 and in which the diode D11 and the Zener diode Dz12 are reversely connected in series with each other clamps the voltage applied in a reverse direction between the base and emitter of the transistor Q3 and can thereby provide protection from application of an overvoltage.

Figure 14:
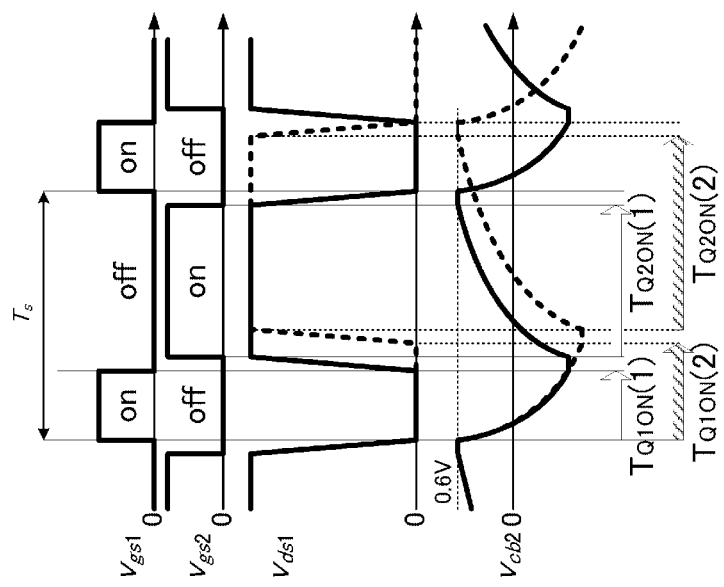
FIG. 14 is a waveform diagram illustrating the relationships between the gate-source voltage Vgs1 of the first switching element Q1, the gate-source voltage Vgs2 of the second switching element Q2, the drain-source voltage Vds1 of the first switching element Q1 and the voltage Vcb2 of the capacitor Cb2, in FIG. 13.

FIG. 14 is a waveform diagram illustrating the relationships between the gate-source voltage Vgs1 of the first switching element Q1, the gate-source voltage Vgs2 of the second switching element Q2, the drain-source voltage Vds1 of the first switching element Q1 and the voltage Vcb2 of the capacitor Cb2 in FIG. 13.

When the first switching element Q1 is turned on, a negative voltage is induced in the high-side driving winding nb2 and the charging voltage VCb2 of the capacitor Cb2 decreases from approximately 0.6 V, for example. After that, when the first switching element Q1 is turned off, a positive voltage is induced in the high-side driving winding nb2 and the charging voltage VCb2 of the capacitor Cb2 rises. When the charging voltage VCb2 of the capacitor Cb2 exceeds approximately 0.6 V, for example, the transistor Q3 is turned on. Thus, the gate potential of the second switching element Q2 becomes 0 V and the second switching element Q2 is turned off.

The charging time constant and the discharge time constant of the capacitor Cb2 are different from each other, but the ratio between these constants is substantially constant. Consequently, the on period ratio Da ($=T_{Q2ON}/T_{Q1ON}$) remains constant in a predetermined relationship.

Ninth Preferred Embodiment

Figure 15:
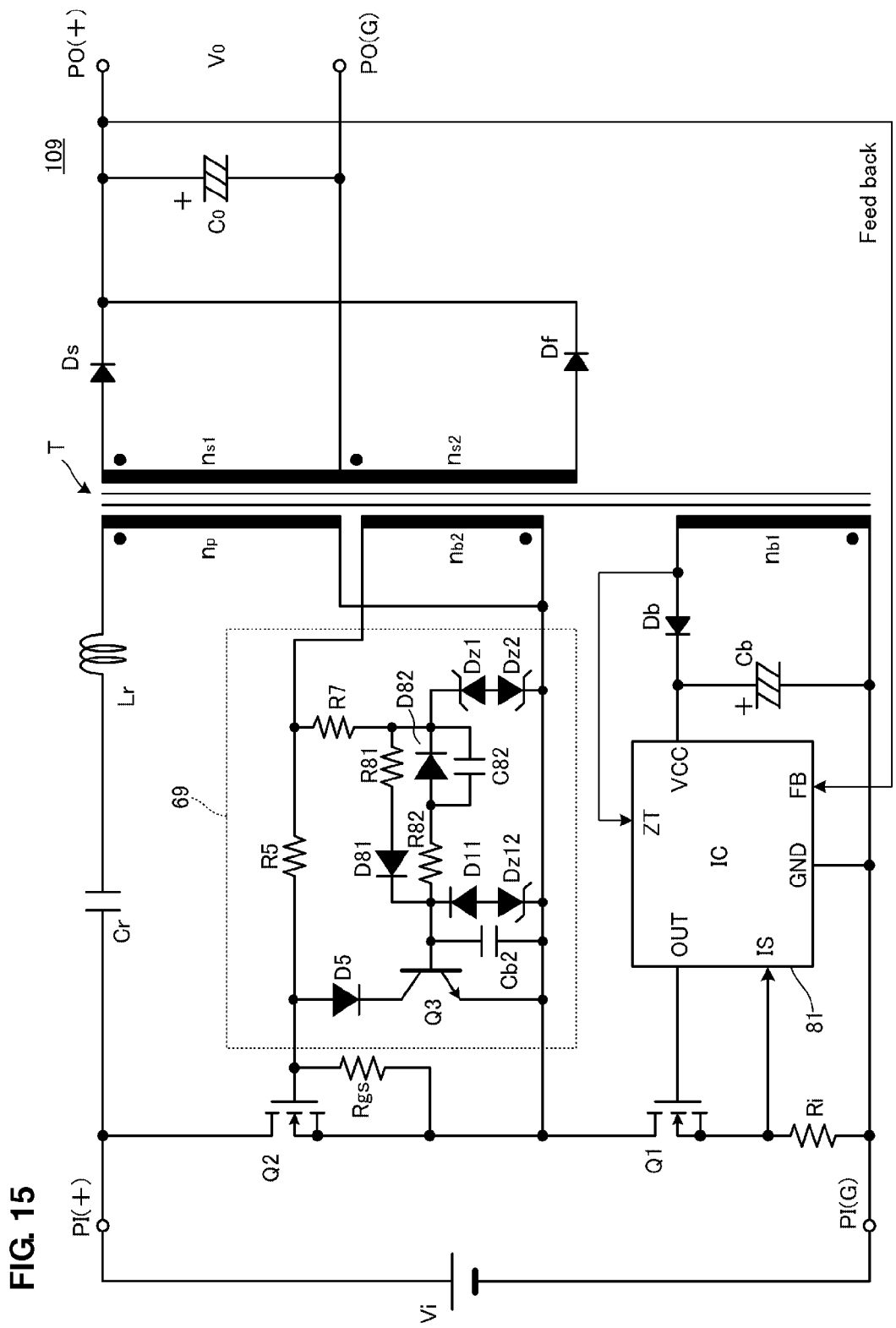
FIG. 15 is a circuit diagram of a switching power supply apparatus 109 according to a ninth preferred embodiment of the present invention.

FIG. 15 is a circuit diagram of a switching power supply apparatus 109 according to a ninth preferred embodiment.

The configuration of second switching control circuit 69 of the switching power supply apparatus 109 differs from that of the switching power supply apparatus illustrated in FIG. 13. In this example, a series circuit including the resistor R81 and the diode D81 and a series circuit including the resistor R82 and the diode D82 are connected in parallel, and a circuit, in which two Zener diodes Dz1 and Dz2 are reversely connected in series with each other, is connected between a connection point between this parallel circuit and the resistor R7, and an end of the high-side driving winding nb. That is, the Zener diodes Dz1 and Dz2 are additionally provided.

Thus, the output of the high-side driving winding nb is input to a series circuit including the Zener diodes Dz1 and Dz2 and the resistor R7 and the voltage of the series circuit including the Zener diodes Dz1 and Dz2 is supplied, such that the effect of variations in the voltage of the high-side driving winding nb can be suppressed and compensated for.

Tenth Preferred Embodiment

Figure 16:
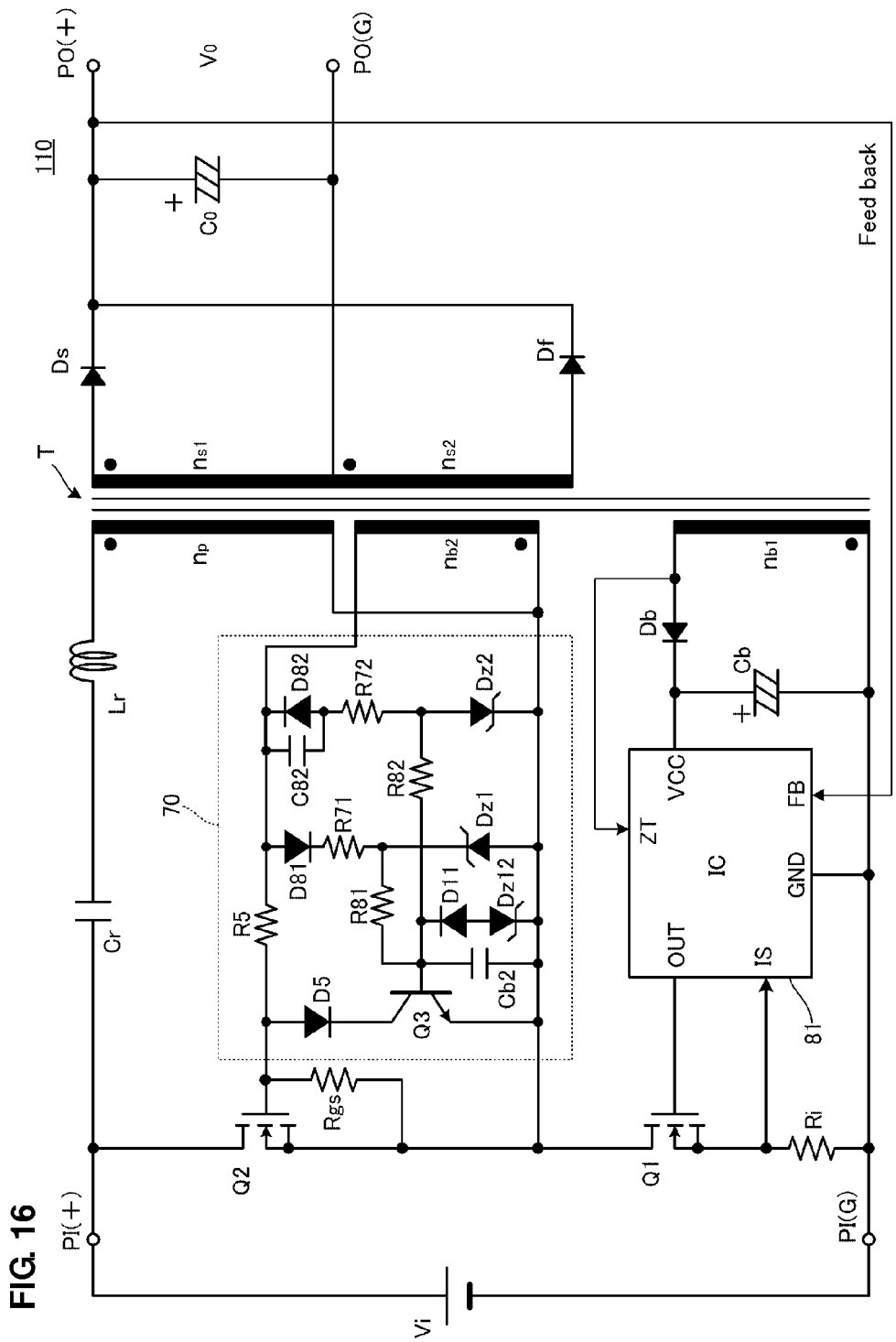
FIG. 16 is a circuit diagram of a switching power supply apparatus 110 according to a tenth preferred embodiment of the present invention.

FIG. 16 is a circuit diagram of a switching power supply apparatus 110 according to a tenth preferred embodiment.

The configuration of a second switching control circuit 70 of the switching power supply apparatus 110 differs from that of the switching power supply apparatus illustrated in FIG. 15. The connection relationship between the Zener diodes Dz1 and Dz2 and other connection relationships are different, but the operational effect is basically the same as that of the ninth preferred embodiment.

Thus, the output of the high-side driving winding nb2 is input to a series circuit including the Zener diodes Dz1 and Dz2 and resistors R71 and R72, and the voltage applied to the Zener diodes Dz1 and Dz2 is supplied to a series circuit composed of the capacitor Cb2 and the resistor R81 or the resistor R82, such that the effect of variations in voltage of the high-side driving winding nb2 can be suppressed and compensated for.

Eleventh Preferred Embodiment

Figure 17:
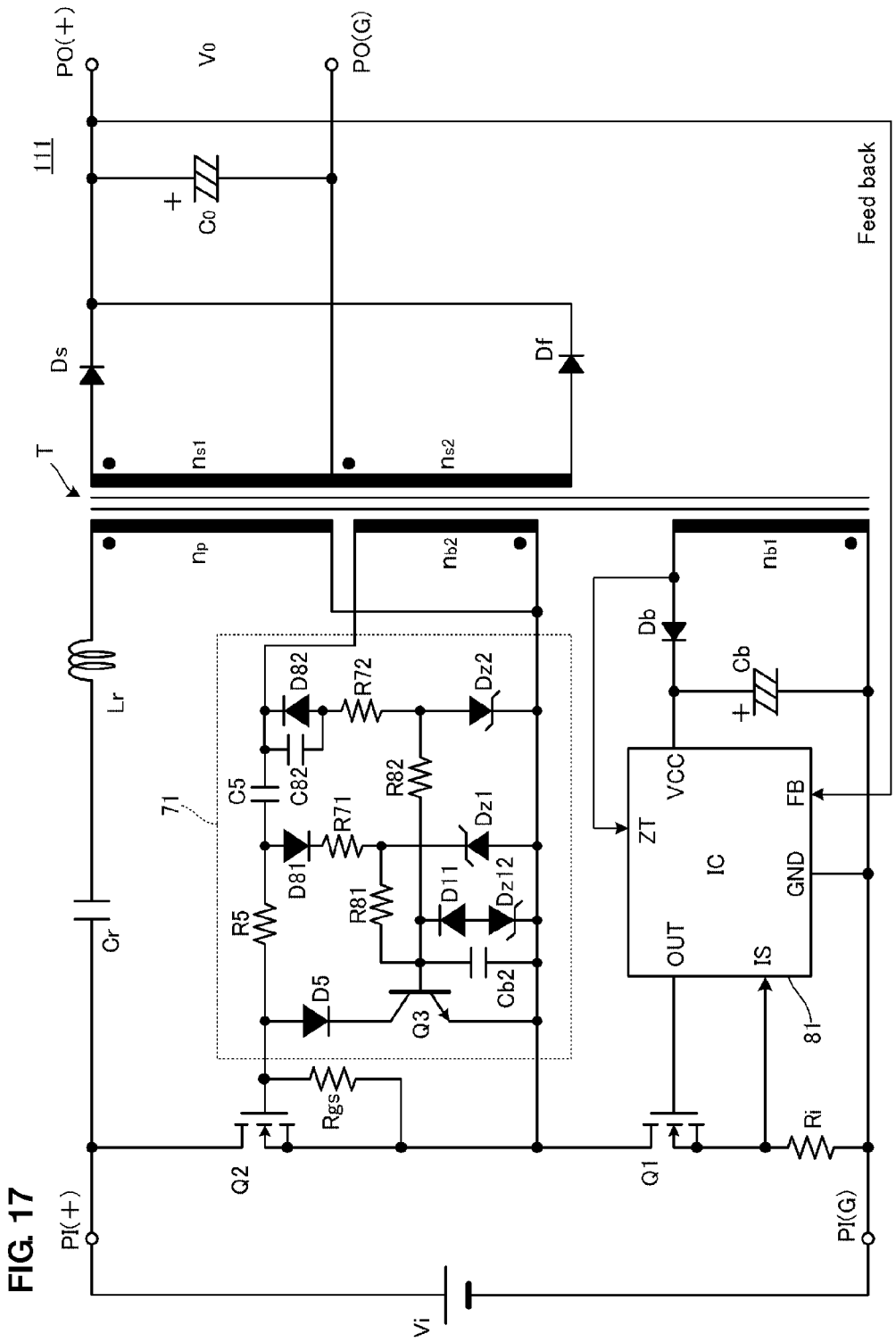
FIG. 17 is a circuit diagram of a switching power supply apparatus 111 according to an eleventh preferred embodiment of the present invention.

FIG. 17 is a circuit diagram of a switching power supply apparatus 111 according to an eleventh preferred embodiment.

The configuration of a second switching control circuit 71 of the switching power supply apparatus 111 differs from that of the switching power supply apparatus illustrated in FIG. 16. In the second switching control circuit 71, the capacitor C5 is connected in series with the resistor R5.

The capacitor C5 and the resistor R5 operate as a delay circuit that is based on a time constant regarding application of a voltage to the gate of the second switching element Q2, are connected to an input capacitance between the gate and the source of the second switching element Q2 and control a turn on delay period for the second switching element Q2 and a voltage between the gate and the source of the second switching element Q2.

Twelfth Preferred Embodiment

Figure 18:
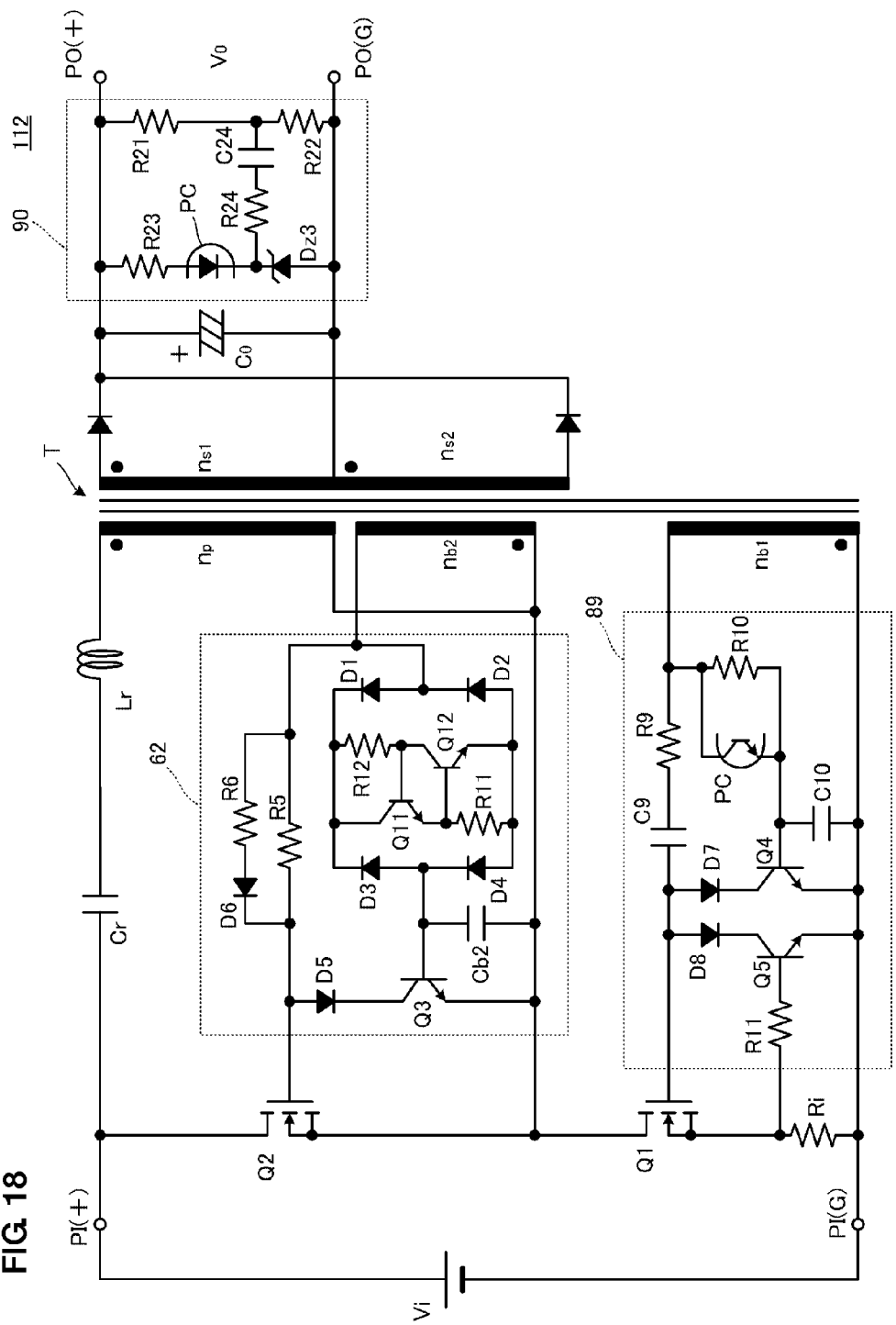
FIG. 18 is a circuit diagram of a switching power supply apparatus 112 according to a twelfth preferred embodiment of the present invention.

FIG. 18 is a circuit diagram of a switching power supply apparatus 112 according to a twelfth preferred embodiment.

The configuration of a first switching control circuit 89 of the switching power supply apparatus 112 differs from that of the switching power supply apparatus of the second preferred embodiment illustrated in FIG. 5. In this example, the driving control circuit of the first switching element Q1 includes discrete components rather than an IC. In addition, in this example, a specific example of an output voltage detection circuit 90 will also be described.

The output voltage detection circuit 90 preferably includes a series circuit including a resistor R23, a light-emitting element of a photocoupler PC and a Zener diode Dz3, a resistance dividing circuit including resistors R21 and R22, and a resistor R24 and a capacitor C24 connected between the an output portion of the resistor dividing circuit and the cathode of the Zener diode Dz3.

With the thus-structured output voltage detection circuit 90, the higher the output voltage or the larger the rate of change of the rise, the more the amount of light emitted by the photocoupler PC is increased, and in the first switching control circuit 89, one end of the low-side driving winding nb1 is connected to the gate of the first switching element Q1 via a resistor R9 and a capacitor C9. A series circuit including a diode D7 and a transistor Q4 is connected between the gate and the ground of the first switching element Q1. A charging/discharging circuit (time constant circuit) including the light-emitting element of the photocoupler PC, a resistor R10, and a capacitor C10 is connected between the two ends of the low-side driving winding nb1. The capacitor C10 is connected to the transistor Q4 such that the voltage of the capacitor C10 is applied to the base of the transistor Q4.

In addition, a series circuit including a diode D8 and a transistor Q5 is connected between the gate and ground of the first switching element Q1. Furthermore, a resistor R11 is connected between the source of the first switching element Q1 and the base of the transistor Q5.

The operation of the first switching control circuit 89 is as follows.

First, an initiation operation, that is, an overcurrent protection operation, which will be described later, is started as a result of the first switching element Q1 being turned on by an initiation circuit, which is not illustrated, (for example an initiation resistor connected between PI(+) and the gate terminal of Q1). In a rated operation, charging of a charging/discharging circuit (time constant circuit) that charges and discharges the capacitor C10 via a parallel circuit including a phototransistor element of the photocoupler PC and the resistor R10 is initiated by a positive voltage generated in the low-side driving winding nb1. When the charging voltage of the capacitor C10 reaches approximately 0.6 V, for example, the transistor Q4 is turned on. Thus, the gate potential of the first switching element Q1 drops and the first switching element Q1 is turned off. As a result of the switching element Q1 being turned off, a negative voltage is generated in the low-side driving winding nb1, such that charge of the capacitor C10 is discharged and a negative voltage is charged.

After the first switching element Q1 is turned off, the second switching element Q2 is turned on for a time period exactly the same as the on period of the first switching element Q1 and is then turned off by operation of the second switching control circuit 62.

The second switching element Q2 is turned off and as a result a positive voltage generated in the low-side driving winding nb1 is applied to the gate of the first switching element Q1 via the resistor R9 and the capacitor C9, and Q1 is turned on. The above operations are performed repeatedly.

A series circuit including the diode D8 and the transistor Q5 is connected between the gate and the ground of the first switching element Q1, and the resistor R11 is connected between the source of the first switching element Q1 and the base of the transistor Q5. With this configuration, when an overcurrent flows through the first switching element Q1 such that the base potential of the transistor Q5 exceeds approximately 0.6 V, for example, the first switching element Q1 is forcefully turned off due to the transistor Q5 being on. That is, in the initiation operation or overload operation, an overcurrent protection operation is performed.

According to the twelfth preferred embodiment, a reduction in the number of components, and reductions in the size and weight of the switching power supply apparatus can be achieved.

Thirteenth Preferred Embodiment

Figure 19:
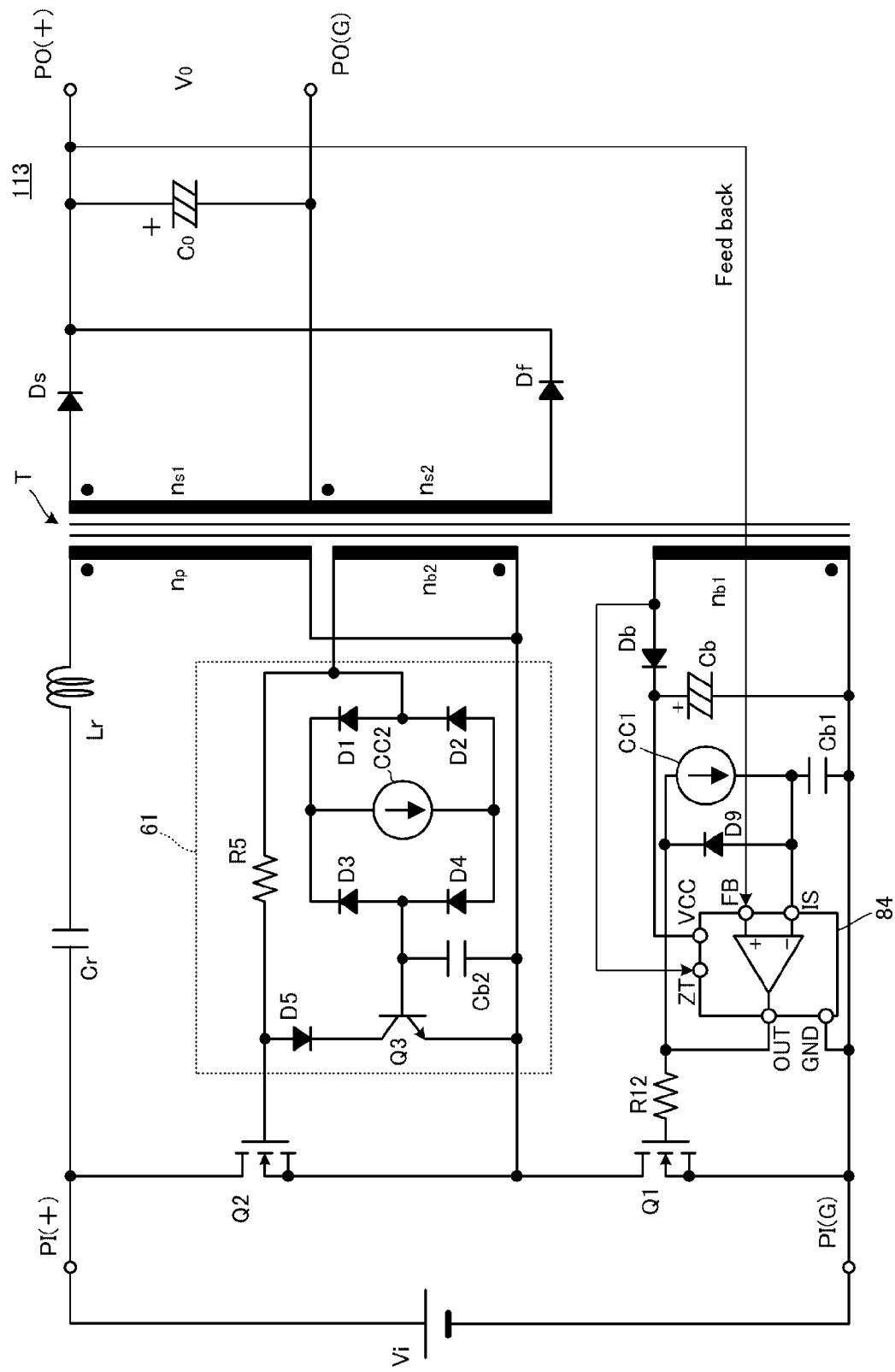
FIG. 19 is a circuit diagram of a switching power supply apparatus 113 according to a thirteenth preferred embodiment of the present invention.

FIG. 19 is a circuit diagram of a switching power supply apparatus 113 according to a thirteenth preferred embodiment.

The configurations of a first switching control IC 84 and peripheral circuits thereof the switching power supply apparatus 113 differ from those of the switching power supply apparatus of the first preferred embodiment illustrated in FIG. 2. The switching control IC 84 is a generally inexpensive IC that operates in a current mode and includes an IS terminal.

The switching control IC 84 is connected such that a series circuit formed of a constant current circuit CC1 and a capacitor Cb1 is connected to the OUT terminal of the switching control IC 84 and such that the charging voltage of the capacitor Cb1 is input to the IS terminal.

The OUT terminal of the switching control IC 84 is set to a high level, as a result of a voltage of a counter electromotive force, induced in the low-side driving winding nb1 due to the second switching element Q2 being turned off, being input to the ZT terminal. As a result, the first switching element Q1 is turned on.

The constant current circuit CC1 charges the capacitor Cb1 with a constant current due to the voltage of the OUT terminal of the switching control IC 84. A comparator inside the switching control IC 84 compares the voltage of the capacitor Cb1 and the voltage of the FB terminal, and the lower the voltage of the FB terminal is, the shorter the charging period of the capacitor Cb1 is. That is, the on period of the first switching element Q1 becomes shorter and the voltage is made constant. The diode D9 defines a discharge path for charge of the capacitor Cb1.

Fourteenth Preferred Embodiment

Figure 20:
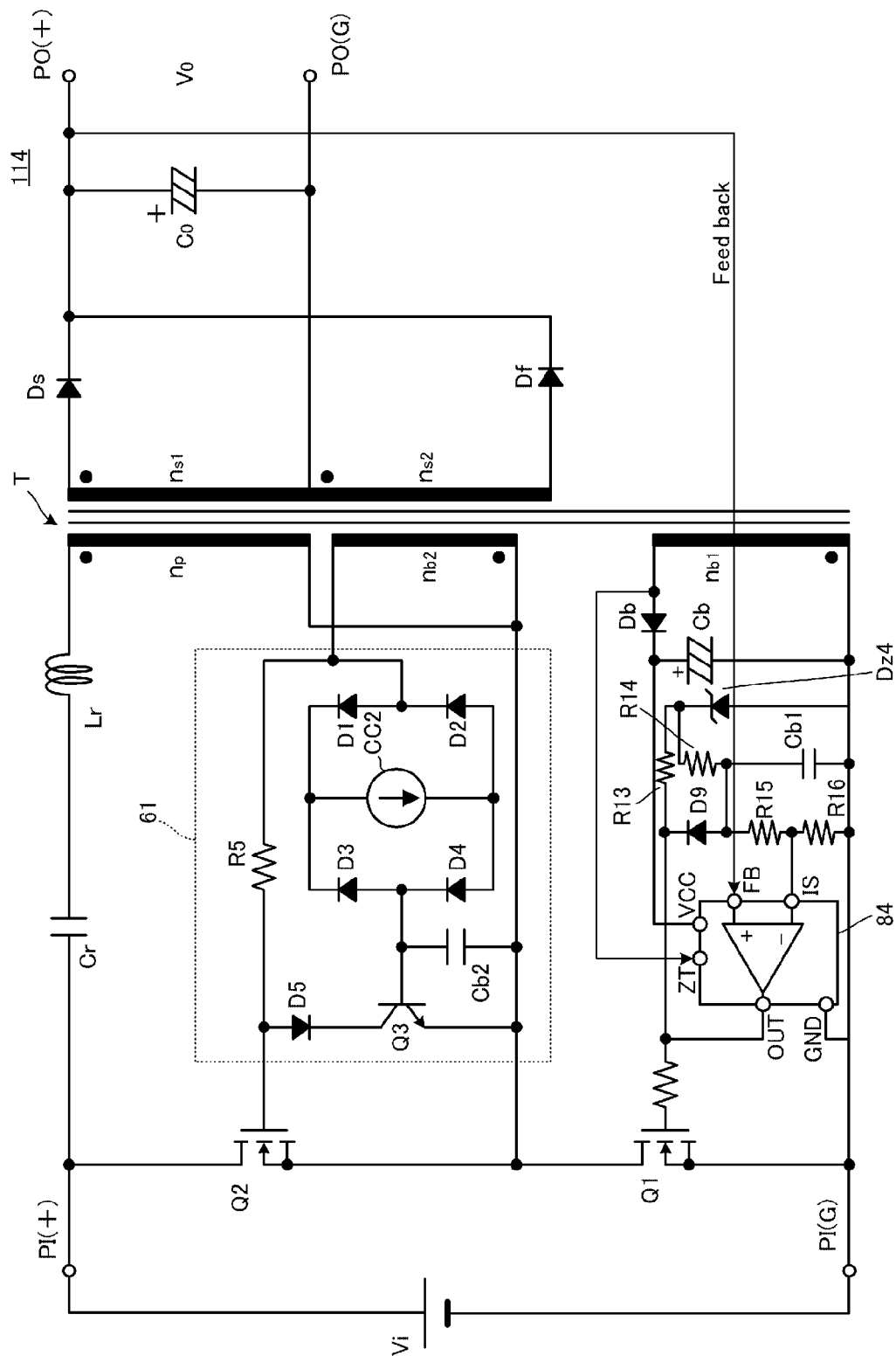
FIG. 20 is a circuit diagram of a switching power supply apparatus 114 according to a fourteenth preferred embodiment of the present invention.

FIG. 20 is a circuit diagram of a switching power supply apparatus 114 according to a fourteenth preferred embodiment.

The configurations of peripheral circuits of the first switching control IC 84 of the switching power supply apparatus 114 differ from those of the switching power supply apparatus of the thirteenth preferred embodiment illustrated in FIG. 19. A constant voltage circuit including a resistor R13 and a Zener diode Dz4 is provided at the OUT terminal of the switching control IC 84. A time constant circuit including a resistor R14 and the capacitor Cb1 is connected to the Zener diode Dz4. A resistance dividing circuit including resistors R15 and R16 is connected to the two ends of the capacitor Cb1. An output voltage of this resistance dividing circuit is connected to the IS terminal of the switching control IC 84.

The rest of the configuration is preferably the same as that of the seventh preferred embodiment.

Thus, it can be ensured that the time constant circuit is charged with a constant voltage.

Fifteenth Preferred Embodiment

Figure 21:
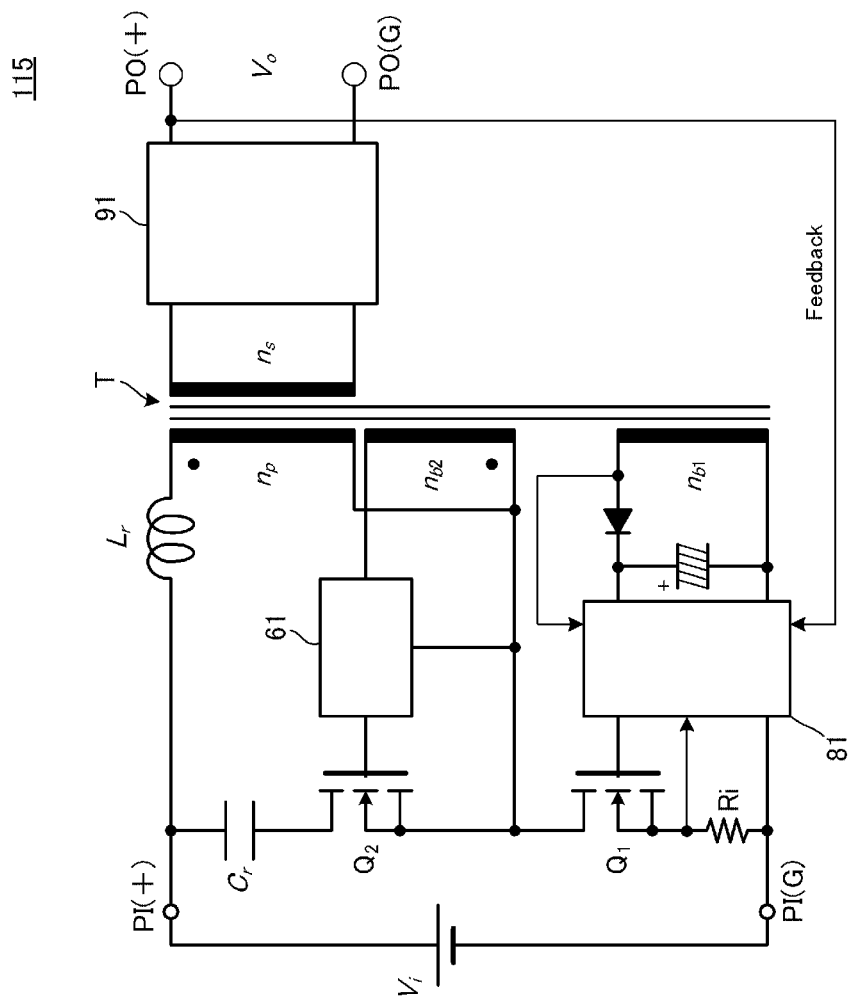
FIG. 21 is a circuit diagram of a switching power supply apparatus 115 according to a fifteenth preferred embodiment of the present invention.

FIG. 21 is a circuit diagram of a switching power supply apparatus 115 according to a fifteenth preferred embodiment.

The switching power supply apparatus 115 differs from the switching power supply apparatus of the first preferred embodiment illustrated in FIG. 2, in terms of the position of the capacitor Cr. In FIG. 21, the secondary side of the transformer T is illustrated in block form as a rectifying smoothing circuit 91.

A resonance capacitor Cr may be inserted into the path along which a current flowing through the inductor Lr flows when the first switching element Q1 is off. Consequently, the capacitor Cr may be connected between the drain of the second switching element Q2 and the input terminal PI(+) as in FIG. 21.

Sixteenth Preferred Embodiment

Figure 22:
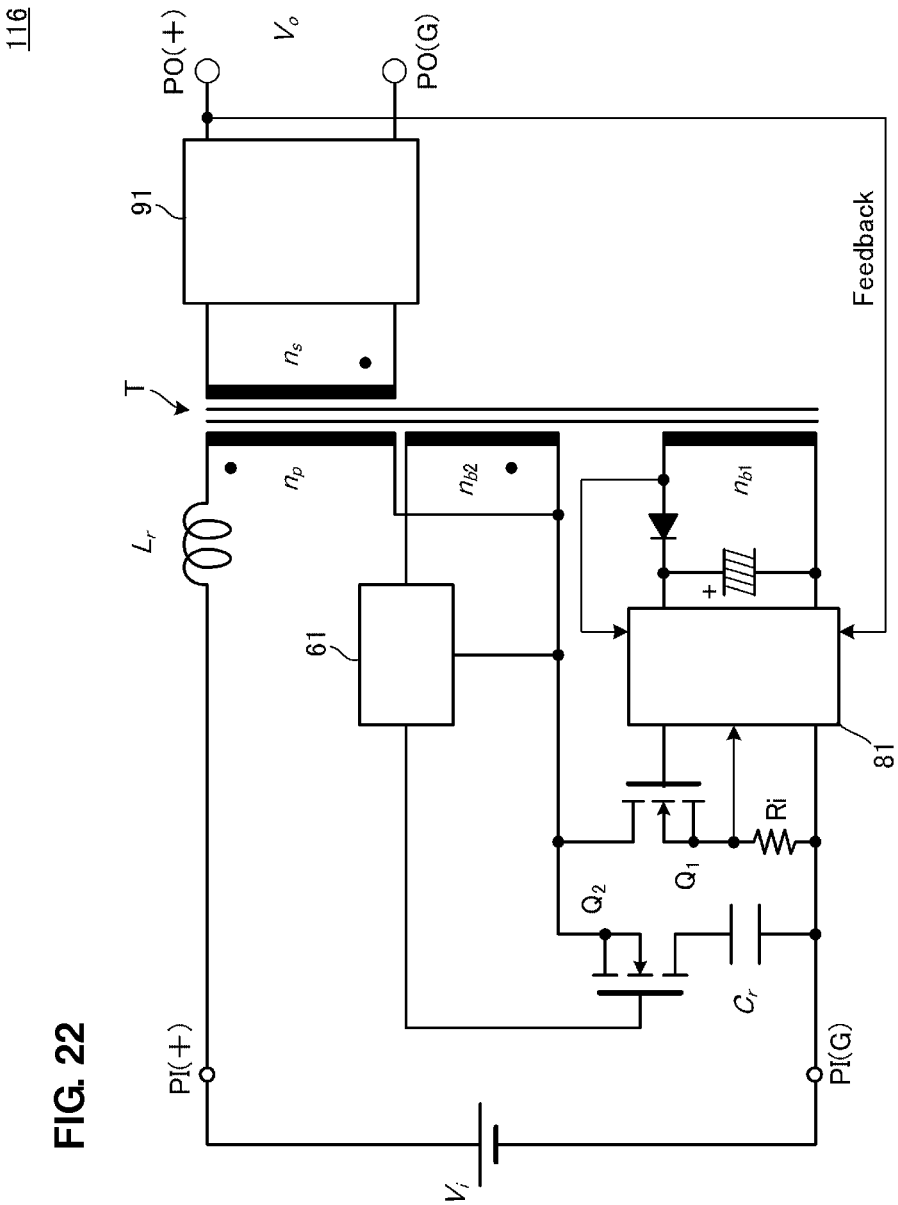
FIG. 22 is a circuit diagram of a switching power supply apparatus 116 according to a sixteenth preferred embodiment of the present invention.

FIG. 22 is a circuit diagram of a switching power supply apparatus 116 according to a sixteenth preferred embodiment.

The switching power supply apparatus 116 differs from the switching power supply apparatus of the first preferred embodiment illustrated in FIG. 2 in terms of the positions of the second switching element Q2 and the capacitor Cr.

The resonance capacitor Cr may be inserted into a path along which the current flowing through the inductor Lr flows when the first switching element Q1 is off, and therefore the capacitor Cr may be inserted between the drain of the second switching element Q2 and the input terminal PI(G) as in FIG. 22.

Seventeenth Preferred Embodiment

Figure 23:
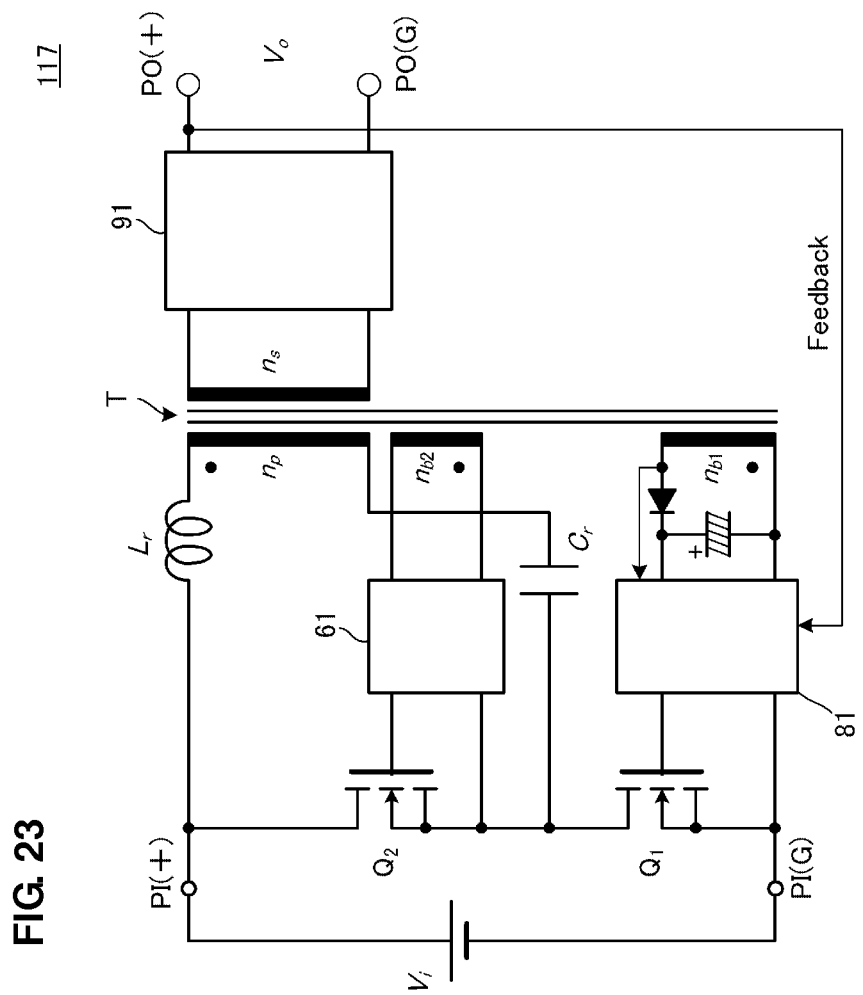
FIG. 23 is a circuit diagram of a switching power supply apparatus 117 according to a seventeenth preferred embodiment of the present invention.

FIG. 23 is a circuit diagram of a switching power supply apparatus 117 according to a seventeenth preferred embodiment.

The switching power supply apparatus 117 differs from the switching power supply apparatus of the first preferred embodiment illustrated in FIG. 2 in terms of the positions of the second switching element Q2 and the capacitor Cr.

The resonance capacitor Cr may be inserted into a path along which the current flowing through the inductor Lr flows when the first switching element Q1 is off, and therefore the capacitor Cr may be inserted between one end of the primary winding np1 and the source of the second switching element Q2 as in FIG. 23.

Eighteenth Preferred Embodiment

Figure 24:
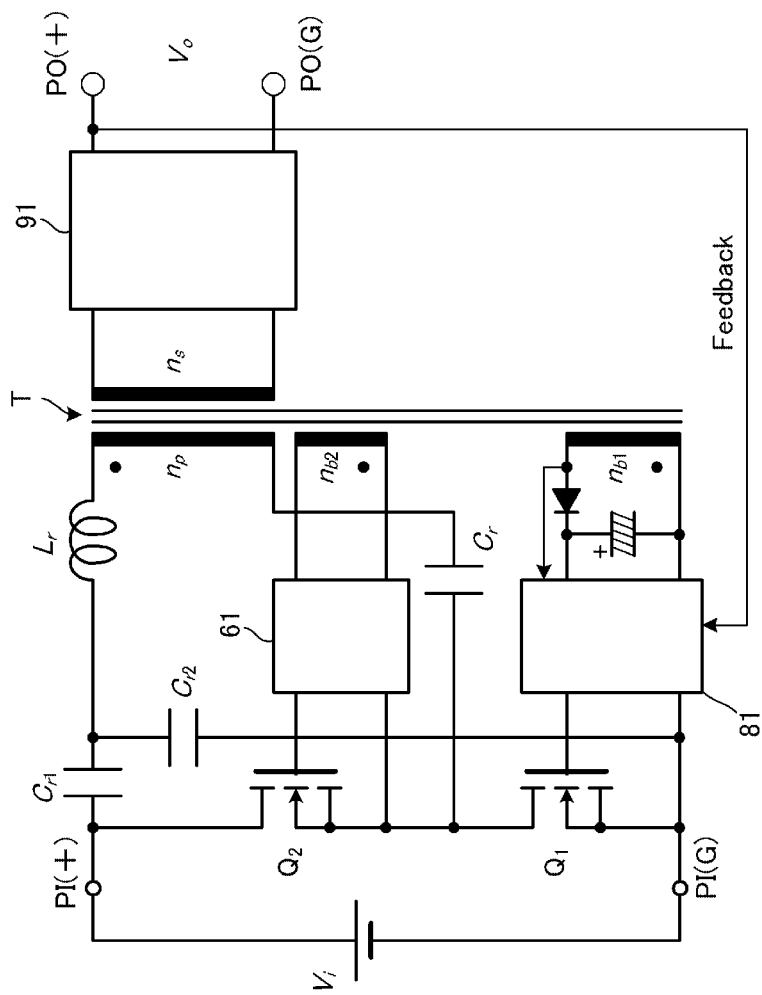
FIG. 24 is a circuit diagram of a switching power supply apparatus 118 according to an eighteenth preferred embodiment of the present invention.

FIG. 24 is a circuit diagram of a switching power supply apparatus 118 according to an eighteenth preferred embodiment.

The switching power supply apparatus 118 differs from the switching power supply apparatus of the seventeenth preferred embodiment illustrated in FIG. 23, in that capacitors Cr1 and Cr2 are provided in addition to the capacitor Cr.

The capacitors Cr and Cr1 are preferably arranged so that the inductor, the primary winding np, the capacitor Cr, the second switching element Q2 and the capacitor Cr1 define a closed loop.

In addition, the capacitor Cr2 is connected between a connection point between the capacitor Cr1 and the inductor Lr, and the input terminal PI(G). In this way, resonance capacitors (Cr1, Cr2) that are connected in series with the second switching element Q2 may be provided in a plurality.

By connecting the capacitor Cr2, the current supplied from the power supply voltage Vi flows during both the on period of the first switching element Q1 and the on period of the second switching element Q2, and compared with a circuit configuration of FIG. 23 in which the current only flows during the on period of the first switching element Q1, the effective current of the current supplied from the power supply voltage Vi is decreased. Thus, conductive loss due to current supplied from the power supply voltage Vi can be decreased.

Nineteenth Preferred Embodiment

Figure 25:
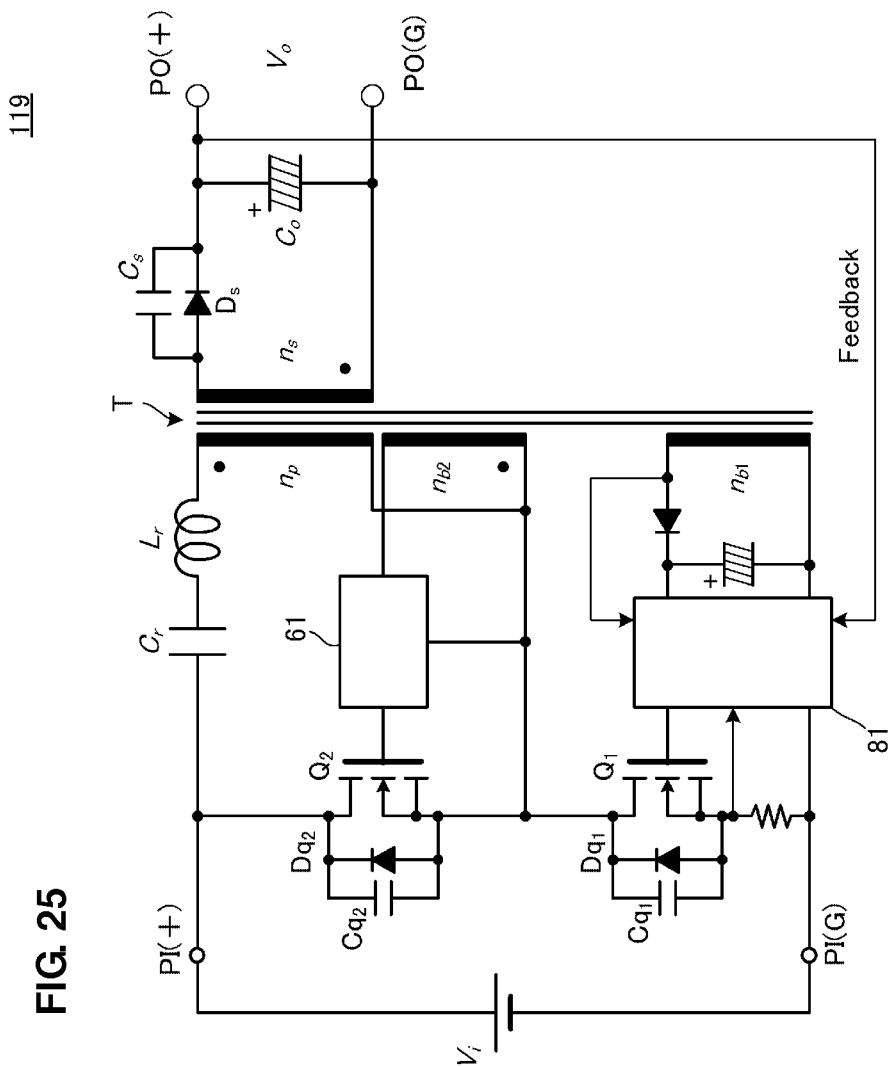
FIG. 25 is a circuit diagram of a switching power supply apparatus 119 according to a nineteenth preferred embodiment of the present invention.

FIG. 25 is a circuit diagram of a switching power supply apparatus 119 according to a nineteenth preferred embodiment.

In this example, the secondary winding ns of the transformer T is provided with a rectifying smoothing circuit that preferably includes a diode Ds and a capacitor Co. In addition, a capacitor Cs is connected in parallel with the diode Ds. With the thus-configured secondary side, the switching power supply apparatus 119 operates as a half-wave rectifying converter.

In addition, in FIG. 25, a parasitic diode Dq1 and a parasitic capacitance Cq1 of the first switching element Q1 and a parasitic diode Dq2 and a parasitic capacitance Cq2 of the second switching element Q2 are illustrated. A diode having the same orientation as the parasitic diode may be attached outside both terminals of the switching elements Q1 and Q2. In addition, a capacitor may be attached outside both terminals of the switching elements Q1 and Q2.

Twentieth Preferred Embodiment

Figure 26:
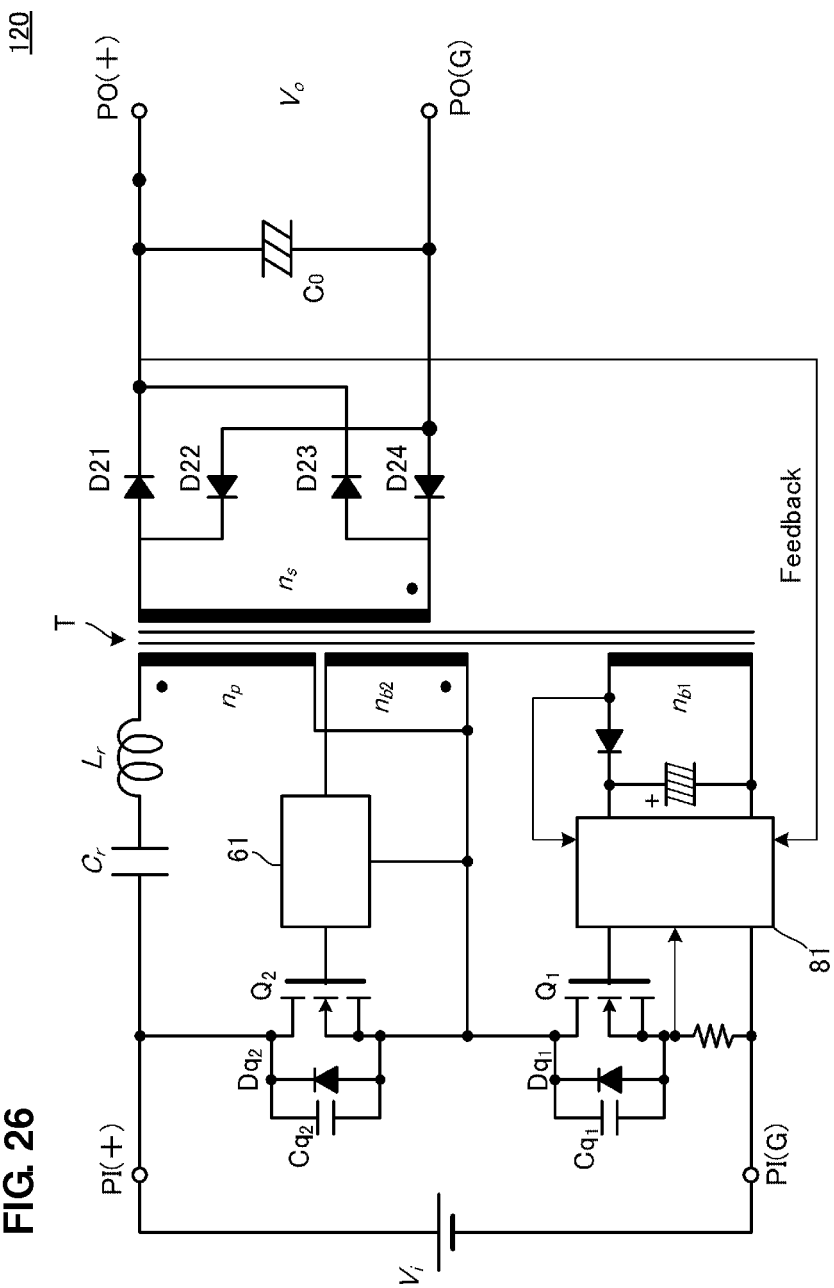
FIG. 26 is a circuit diagram of a switching power supply apparatus 120 according to a twentieth preferred embodiment of the present invention.

FIG. 26 is a circuit diagram of a switching power supply apparatus 120 according to a twentieth preferred embodiment.

The switching power supply apparatus 120 differs from the switching power supply apparatus of the first preferred embodiment illustrated in FIG. 2 in terms of the configuration of the secondary side of the transformer T.

In the twentieth preferred embodiment, a diode bridge circuit, which includes diodes D21, D22, D23 and D24, and a capacitor Co are connected to the secondary winding ns of the transformer T. Thus, full-wave rectification may be performed by the diode bridge circuit.

Twenty-First Preferred Embodiment

Figure 27:
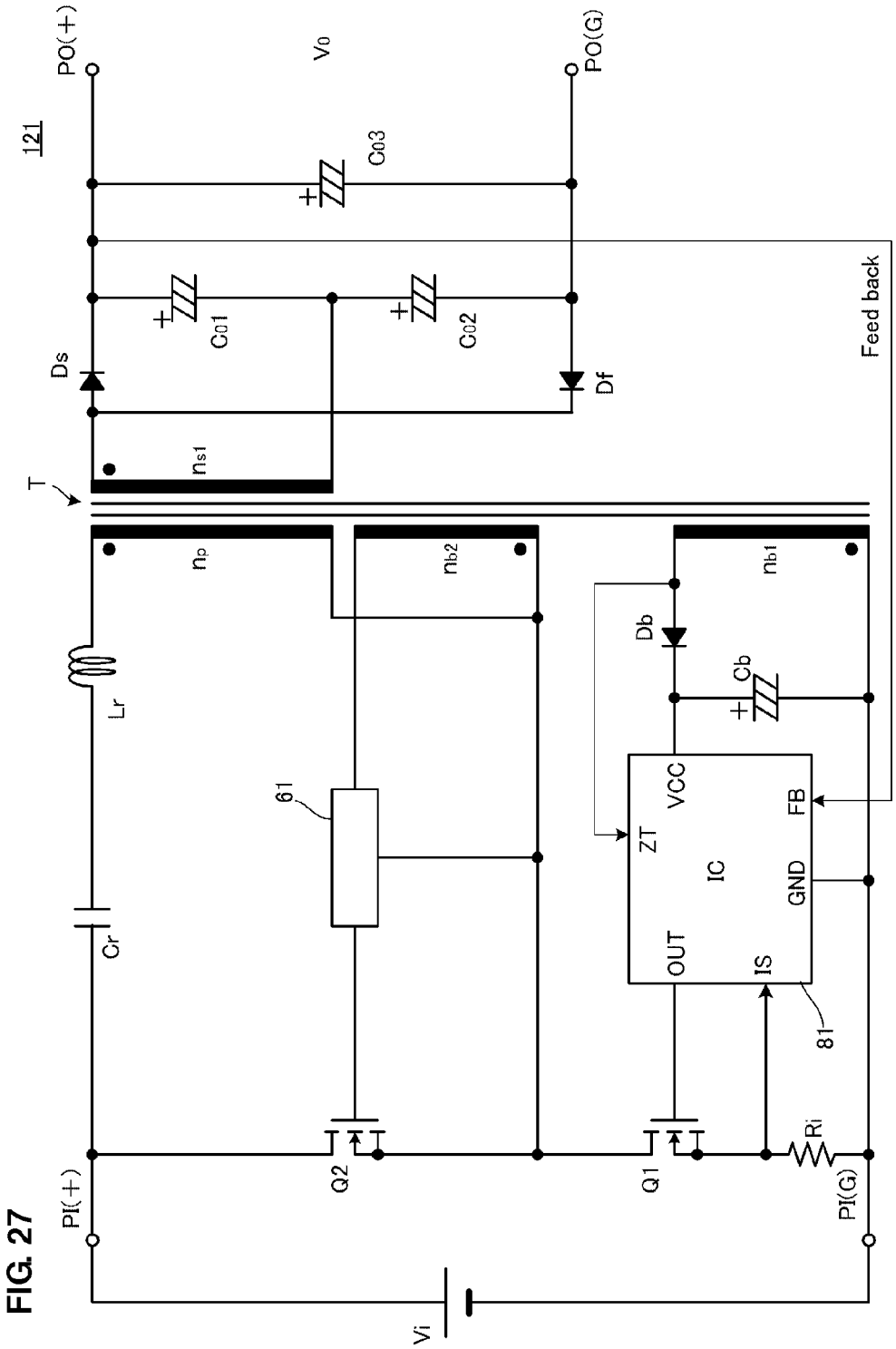
FIG. 27 is a circuit diagram of a switching power supply apparatus 121 according to a twenty-first preferred embodiment of the present invention.

FIG. 27 is a circuit diagram of a switching power supply apparatus 121 according to a twenty-first preferred embodiment.

The switching power supply apparatus 121 differs from the switching power supply apparatus of the first preferred embodiment illustrated in FIG. 2 in terms of the configuration of the secondary side of the transformer T.

In the twenty-first preferred embodiment, a rectifying smoothing circuit including the diode Ds and a capacitor Co1 is connected to the two ends of the secondary winding ns1 of the transformer T and a capacitor Co3 is connected between the output terminals PO(+) and PO(G). In addition, a central point in the series circuit including the diode Df and a capacitor Co2 is connected to the output terminal PO(G) and the two ends of the series circuit are connected to the two ends of the secondary winding ns1 of the transformer T.

In this way, a voltage doubler rectifying circuit may be provided.

In each of the above-described preferred embodiments, a rectifying circuit including a diode is provided in the secondary-side circuit of the transformer T, but simultaneous rectification may be performed by providing a FET for rectification instead of a diode. Thus, loss of the secondary-side circuit can be reduced.

In addition, various preferred embodiments of the present invention can be applied to switching power supply apparatus in which two switching elements are turned on and off in a complimentary manner for multiple element converters such as not only half bridge converters but also full bridge converters and voltage clamp converters.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A switching power supply apparatus comprising:
a direct current power supply input unit to which a direct current input voltage is input;
a transformer that includes at least a primary winding, a secondary winding, and a high-side driving winding, which are magnetically coupled;
a first switching element of a low side and a second switching element of a high side, a ground level of the second switching element being different from that of the first switching element, the first switching element and the second switching element being repeatedly turned on and off in a complementary manner such that the direct current input voltage is applied to the primary winding in an on and off manner;
a first switching control circuit that controls the first switching element;
a second switching control circuit that controls the second switching element;
the switching power supply apparatus outputting a load current and supplying an output voltage in accordance with a voltage output from the secondary winding; wherein
the first switching control circuit is a circuit that outputs a predetermined on period continuance signal to a control terminal of the first switching element and that turns the first switching element off after the first switching element has been on for a predetermined on period;
the second switching control circuit includes:
a first capacitor;
a bidirectional constant current circuit that includes a discharge current setting circuit that sets a discharge current to be discharged from the first capacitor in a negative direction at a substantially constant discharge current on the basis of a voltage generated in the high-side driving winding in the on period of the first switching element, and a charging current setting circuit that sets a charging current with which the first capacitor is to be charged in a positive direction at a substantially constant charging current on the basis of a voltage generated in the high-side driving winding in the off period of the first switching element;

a transistor that is controlled by the charging voltage of the first capacitor, and when the charging voltage of the first capacitor exceeds a predetermined threshold, controls a voltage of the control terminal of the second switching element and causes the second switching element to be turned off; and a turn on signal transmitting circuit that applies a voltage generated in the high-side driving winding to the control terminal of the second switching element and causes the second switching element to be turned on;

the second switching control circuit setting a charging/discharge current ratio, which is a ratio of the charging current to the discharge current; and controlling the on period of the second switching element such that an on period ratio, which is a ratio of the on period of the second switching element with respect to the on period of the first switching element, remains substantially constant with respect to changes in load current.

2. The switching power supply apparatus according to claim 1, wherein the second switching control circuit causes the second switching element to be turned on via the turn on signal transmitting circuit due to a voltage generated in the high-side driving winding, turning off of the first switching element serving as a trigger, and sets the charging/discharge current ratio to be substantially one and controls the on period of the second switching element such that the on period ratio remains substantially one with respect to changes in the load current.

3. The switching power supply apparatus according to claim 1, wherein the second switching control circuit causes the second switching element to be turned on via the turn on signal transmitting circuit due to a voltage generated in the high-side driving winding, turning off of the first switching element serving as a trigger, performs setting so that Di is larger than $ns \cdot Vi/np \cdot Vo$, where Di denotes the charging/discharge current ratio, Vi denotes the direct current input voltage, Vo denotes the output voltage, np denotes the number of turns of the primary winding, and ns denotes the number of turns of the secondary winding, and controls the on period of the second switching element such that the on period ratio remains substantially constant with respect to changes in the load current.

4. The switching power supply apparatus according to claim 1, wherein the bidirectional constant current circuit includes a constant current circuit that includes an operational amplifier.

5. The switching power supply apparatus according to claim 1, wherein the bidirectional constant current circuit includes a constant current circuit including a transistor circuit in which a base of a first transistor is connected to a collector of a second transistor and an emitter of the first transistor is connected to a base of the second transistor.

6. The power supply switching apparatus according to claim 1, wherein the bidirectional constant current circuit includes a constant current circuit including a Zener diode and a resistor.

7. The power supply switching apparatus according to claim 4, wherein the bidirectional constant current circuit includes a diode bridge rectifying circuit including four diodes and one constant current circuit connected between output terminals of the diode bridge rectifying circuit.

8. The switching power supply apparatus according to claim 1, wherein the bidirectional constant current circuit includes a bidirectional constant voltage circuit in which two Zener diodes are reversely connected in series with each other, is input with a voltage of the high-side driving winding, and generates a bidirectional constant voltage.

9. The power supply switching apparatus according to claim 2, wherein a capacitor is connected in parallel with at least one rectifying diode that rectifies a voltage generated in the high-side driving winding and allows a current to pass through the discharge current setting circuit or the charging current setting circuit.

10. The power supply switching apparatus according to claim 2, wherein a resistor is connected in parallel with at least one rectifying diode that rectifies a voltage generated in the high-side driving winding and allows a current to pass through the discharge current setting circuit or the charging current setting circuit.

11. The switching power supply apparatus according to claim 1, wherein the transformer includes a low-side driving winding, one end of the low-side driving winding being connected to a low potential side of the direct current power supply input unit, the other end of the low-side driving winding being connected such that a direct current power supply voltage is supplied to the first switching control circuit via a second rectifying smoothing circuit.

12. The power supply switching apparatus according to claim 11, wherein the first switching control circuit includes:

a switching element driving circuit that outputs a driving voltage signal that causes the first switching element to be turned on when inversion of the voltage polarity of the transformer due to the low-side driving winding is detected; and a voltage—period conversion circuit that controls a period from turning on of the first switching element until turning off of the first switching element, in accordance with the voltage of a feedback signal generated by detecting the output voltage and comparing the output voltage with a reference voltage.

* * * * *